United States Patent [19]
Greenberg et al.

[11] 3,740,722
[45] June 19, 1973

[54] DIGITAL COMPUTER

[75] Inventors: Michael P. Greenberg, Winchester; William E. Fletcher, Woburn; Richard E. Morley, Bedford, all of Mass.

[73] Assignee: Modicon Corporation, Bedford, Mass.

[22] Filed: July 2, 1970

[21] Appl. No.: 52,046

[52] U.S. Cl. ............................................ 340/172.5
[51] Int. Cl. ............................ G06f 3/00, G06f 13/06
[58] Field of Search .................................. 340/172.5

[56] References Cited

UNITED STATES PATENTS

| | | | |
|---|---|---|---|
| 3,566,357 | 2/1971 | Ling | 340/172.5 |
| 3,373,408 | 3/1968 | Ling | 340/172.5 |
| 3,373,407 | 3/1968 | Ling | 340/172.5 |
| 3,094,610 | 6/1963 | Humphrey et al. | 340/172.5 |
| 3,594,732 | 7/1971 | Mendelson et al. | 340/172.5 |
| 3,602,889 | 8/1971 | Gayman et al. | 340/172.5 |
| 3,614,740 | 10/1971 | Delaoi et al. | 340/172.5 |
| 3,400,371 | 9/1968 | Amdahl et al. | 340/172.5 |
| 3,061,192 | 10/1962 | Terzian | 340/172.5 |
| 3,377,619 | 4/1968 | Marsh et al. | 340/172.5 |

OTHER PUBLICATIONS

"IBM/1410 Data Processing System, Reference Manual," IBM Corporation, 1960, pp. 15–19, 27–28 43–44.
"UNIVAC/1107 Thin-Film Memory Computer, General Description," Sperry Rand Corporation, 1961, pp. 1–24.
"IBM/709 Data Processing System, Reference Manual," IBM Corporation, 1959, pp. 13–23, 57–62, 65–74

*Primary Examiner*—Paul J. Henon
*Assistant Examiner*—Jane Rhoads
*Attorney*—Mattern, Ware and Davis

[57] ABSTRACT

Hardware registers which are addressed in the same manner as the main core memory and exchange data with external devices. The computer has no dedicated registers used as the accumulator, program counter and program counter save. Rather, addressed registers in the main core memory are used for these functions. Preferably, there are a plurality of each group comprising a dedicated computational machine. The computational machine which is being operated is specified by a dedicated machine pointer register.

Mass memory, additional computers, as well as input and output devices may be connected to the addressed hardware registers to provide unlimited system expansion. Program instructions may be placed in an addressed hardware register in response to external events.

The main core memory provided contains all possible addresses in the ten bit address word of the computer. When an addressed hardware register is connected to the computer, it becomes responsive to the central processing unit, rather than the identically addressed core position. The core position is reactivated when the hardware register is disabled by events either external or internal to the computer. This dual addressing scheme is controlled by two priority levels.

All address registers and all dedicated machine registers are connected in parallel to a half duplex transfer bus which provides for transfers between any registers connected thereto under control of a central processing unit.

All cycles of the computer are identical and comprise three timing states.

1 Claim, 18 Drawing Figures

United States Patent [19]
Greenberg et al.
[11] 3,740,722
[45] June 19, 1973
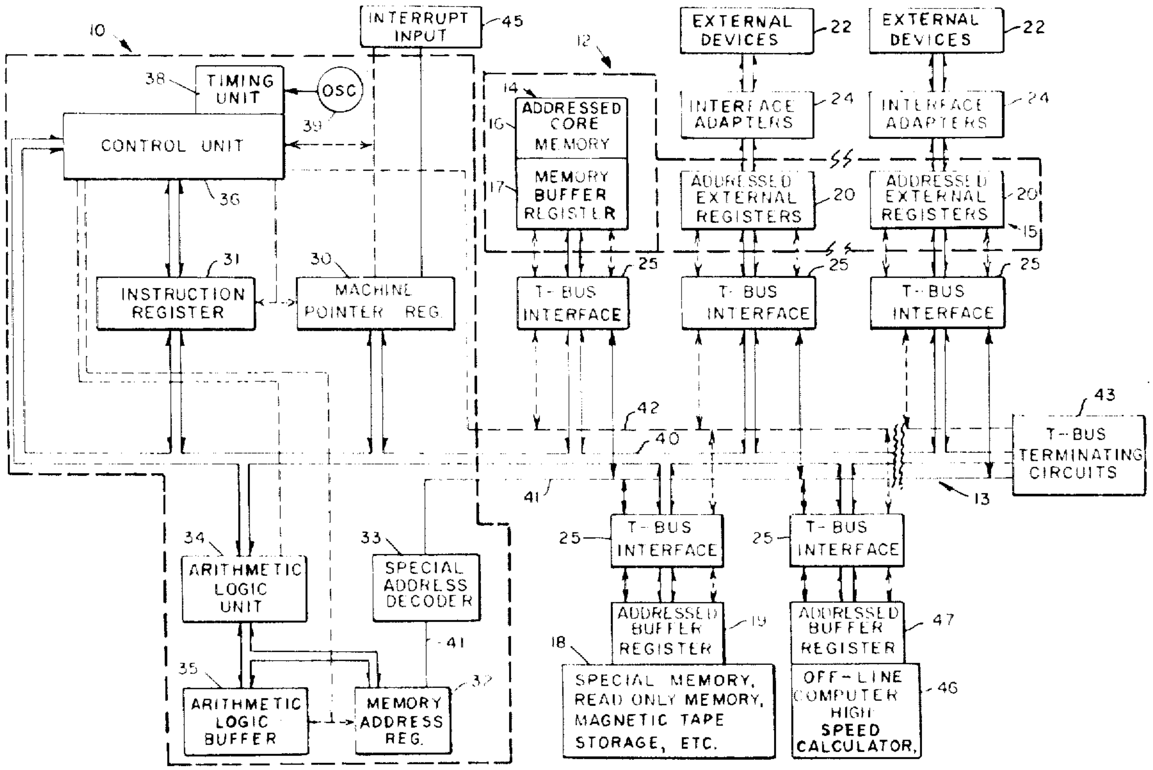

INVENTORS
MICHAEL P. GREENBERG
WILLIAM E. FLETCHER
RICHARD E. MORLEY

BY Mattern Ware and Davis
ATTORNEYS

FIG. 6A

MEMORY REFERENCE INSTRUCTIONS

| INSTRUCTION | MNEMONIC | OP CODE | RESULT |
|---|---|---|---|
| 1 a) DEPOSIT ACCUMULATOR | DAC X | 0 0 0 | (MP+1) → X |
| b) | DAC I X | 0 0 4 | (MP+1) → (X) |
| 2 a) DEPOSIT PROGRAM COUNTER SAVE | DPS X | 0 0 2 | (MP+2) → X |
| b) | DPS I X | 0 0 6 | (MP+2) → (X) |
| 3 a) LOAD ACCUMULATOR | LAC X | 0 1 0 | X→ (MP+1) |
| b) | LAC I X | 0 1 4 | (X)→ (MP+1) |
| c) | LAC P X | 0 1 2 | $IR_{6-15}$→ (MP+1) |
| 4 a) DEPOSIT ZERO IN MEMORY | DZM X | 0 1 6 | 0→ X |
| 5 a) INCLUSIVE OR | IOR X | 0 2 0 | X $\vee$ (MP+1)→ (MP+1) |
| b) | IOR I X | 0 2 4 | (X) $\vee$ (MP+1)→ (MP+1) |
| c) | IOR P X | 0 2 2 | $IR_{6-15}$ $\vee$ (MP+1)→ (MP+1) |
| d) | IOR R X | 0 2 6 | X $\vee$ (MP+1)→ X |
| 6 a) ADD | ADD X | 0 3 0 | X + (MP+1)→ (MP+1) |
| b) | ADD I X | 0 3 4 | (X) + (MP+1)→ (MP+1) |
| c) | ADD P X | 0 3 2 | $IR_{6-15}$ + (MP+1)→ (MP+1) |
| d) | ADD R X | 0 3 6 | X + (MP+1)→ X |
| 7 a) SUBTRACT | SUB X | 0 4 0 | (MP+1) - X→ (MP+1) |
| b) | SUB I X | 0 4 4 | (MP+1) - (X)→ (MP+1) |
| c) | SUB P X | 0 4 2 | (MP+1) -$IR_{6-15}$→ (MP+1) |
| d) | SUB R X | 0 4 6 | X - (MP+1)→ X |
| 8 a) AND | AND X | 0 5 0 | X $\wedge$ (MP+1)→ (MP+1) |
| b) | AND I X | 0 5 4 | (X) $\wedge$ (MP+1)→ (MP+1) |
| c) | AND P X | 0 5 2 | $IR_{6-15}$ $\wedge$ (MP+1)→(MP+1) |
| d) | AND R X | 0 5 6 | X $\wedge$ (MP+1)→ X |
| 9 a) SKIP IF ACCUMULATOR DIFFERENT | SAD X | 0 6 0 | IF(MP+1)≠X,(MP)+1→(MP) |
| b) | SAD I X | 0 6 4 | IF(MP+1)≠(X),(MP)+1→(MP) |
| c) | SAD P X | 0 6 2 | IF(MP+1)≠$IR_{6-15}$,(MP)+1→(MP) |
| d) | SAD X | 0 6 6 | IF(MP+1)≠X,(MP)+1→(MP) |

FIG. 6B

| | | | | | |
|---|---|---|---|---|---|
| 10 a) SKIP IF ACCUMULATOR SAME | SAS | | X | 0 7 0 | IF(MP+1)=X,(MP)+1→(MP) |
| b) | SAS | I | X | 0 7 4 | IF(MP+1)=(X),(MP)+1→(MP) |
| c) | SAS | P | X | 0 7 2 | (MP+1)=$IR_{6-15}$,(MP)+1→(MP) |
| d) | SAS | | X | 0 7 6 | (MP+1)=X,(MP)+1→(MP) |
| 11 a) JUMP AND SAVE | JMS | | X | 1 0 0 | (MP)→(MP+2),$IR_{6-15}$→(MP) |
| | JMS | | X | 1 0 2 | SAME |
| b) | JMS | I | X | 1 0 4 | (MP)→(MP+2),X→(MP) |
| | JMS | I | X | 1 0 6 | SAME |
| 12 a) JUMP | JMP | | X | 1 1 0 | $IR_{6-15}$→(MP) |
| | JMP | | X | 1 1 2 | SAME |
| b) | JMP | I | X | 1 1 4 | X→ (MP) |
| | JMP | I | X | 1 1 6 | SAME |
| 13 a) LOAD MACHINE POINTER | LMP | | X | 1 2 0 | $IR_{6-15}$→MP |
| | LMP | | X | 1 2 2 | SAME |
| b) | LMP | I | X | 1 2 4 | X→ MP |
| | LMP | I | X | 1 2 6 | SAME |
| 14 a) ROTATE AND SKIP IF ODD | RSO | | X | 1 3 0 | $X_j$→$X_{j-1}$;IF $X_{15}$=1, (MP)+1→ (MP) |
| b) | RSO | I | X | 1 3 4 | $(X)_j$→$(X)_{j-1}$;IF$(X)_{15}$=1, (MP)+1→ (MP) |
| 15 a) ROTATE MEMORY LEFT | RML | | X | 1 3 2 | $X_j$→$X_{j-1}$ |
| b) | RML | I | X | 1 3 6 | $(X)_j$→ $(X)_{j-1}$ |
| 16 a) INCREMENT AND SKIP IF ZERO | ISZ | | X | 1 4 0 | X+1→X;IF X=0, (MP)+1→(MP) |
| b) | ISZ | I | X | 1 4 4 | (X)+1→(X);IF (X)=0, (MP)+1→(MP) |
| 17 a) INDEX | IDX | | X | 1 4 2 | X+1→X |
| b) | IDX | I | X | 1 4 6 | (X) + 1→(X) |
| 18 a) DECREMENT AND SKIP IF ZERO | DSZ | | X | 1 5 0 | X-1→X; IF X=0, (MP)+1→(MP) |
| b) | DSZ | I | X | 1 5 2 | (X)-1→(X);IF(X)=0, (MP)+1→(MP) |

| | | | | | |
|---|---|---|---|---|---|
| 19 a) | DECREMENT | DDX | X | 1 5 4 | X-1→X |
| b) | | DDX I | X | 1 5 6 | (X)-1→(X) |
| 20 a) | OPERATE GROUP I | OPI | | 1 6 0 | |
| b) | | | | 1 7 0 | |
| 21 a) | OPERATE GROUP II | OPII | | 1 6 4 | |
| b) | | | | 1 7 4 | |

FIG. 7A

OPERATE GROUP I

| INSTRUCTION | CODE | RESULT |
|---|---|---|
| | **EVENT TIME 1** | |
| COMPLEMENT ACCUMULATOR | BØ5=1 | $(\overline{MP+1}) \rightarrow (MP+1)$ |
| INCREMENT ACCUMULATOR | BØ6=1 | $(MP+1)+1 \rightarrow (MP+1)$ |
| | **EVENT TIME 2** | |
| ROTATE ACCUMULATOR RIGHT 4 BITS | BØ7=1;BØ8=0 | $(MP+1)_j \rightarrow (MP+1)_{j+4}$ |
| ROTATE ACCUMULATOR LEFT 1 BIT | BØ7=1;BØ8=1 | $(MP+1)_j \rightarrow (MP+1)_{j-1}$ |
| | **EVENT TIME 3** | |
| SKIP IF ACCUMULATOR EQUAL ZERO | BØ9=1;B15=0 | IF $(MP+1)=0$, $(MP)+1 \rightarrow (MP)$ |
| DO NOT SKIP IF ACCUMULATOR EQUAL ZERO | BØ9=1;B15=1 | IF $(MP+1)=0$, DO NOT SKIP |
| SKIP IF ACCUMULATOR NOT EQUAL ZERO | B1Ø=1;B15=0 | IF $(MP+1)\neq 0$, $(MP)+1 \rightarrow (MP)$ |
| DO NOT SKIP IF ACCUMULATOR NOT EQUAL ZERO | B1Ø=1;B15=1 | IF $(MP+1)\neq 0$, DO NOT SKIP |
| SKIP IF ACCUMULATOR NEGATIVE | B11=1;B15=0 | IF $(MP+1)_o=0$, $(MP)+1 \rightarrow (MP)$ |
| DO NOT SKIP IF ACCUMULATOR NEGATIVE | B11=1;B15=1 | IF $(MP+1)_o=0$, DO NOT SKIP |
| SKIP IF ACCUMULATOR POSITIVE | B12=1;B15=0 | IF $(MP+1)_o=1$, $(MP)+1 \rightarrow (MP)$ |
| DO NOT SKIP IF ACCUMULATOR POSITIVE | B12=1;B15=1 | IF $(MP+1)_o=1$, DO NOT SKIP |

FIG. 7B

| | | |
|---|---|---|
| SKIP IF ACCUMULATOR ODD | B13=1;B15=0 | IF $(MP+1)_{15}=1$, $(MP)+1 \rightarrow (MP)$ |
| DO NOT SKIP IF ACCUMULATOR ODD | B13=1;B15=1 | IF $(MP+1)_{15}=1$, DO NOT SKIP |
| SKIP IF ACCUMULATOR EVEN | B14=1;B15=0 | IF $(MP+1)_{15}=0$, $(MP)+1 \rightarrow (MP)$ |
| DO NOT SKIP IF ACCUMULATOR EVEN | B14=1;B15=1 | IF $(MP+1)_{15}=0$, DO NOT SKIP |

OPERATE GROUP II

| INSTRUCTION | CODE | RESULT |
|---|---|---|
| READ MACHINE POINTER | BØ5=1 | $(MP) \rightarrow (MP+1)$ |
| RETURN FROM SUBROUTINE | BØ6=1 | $(MP+2) \rightarrow (MP)$ |

FIG. 7C

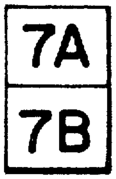

DIGITAL COMPUTER

BACKGROUND OF THE INVENTION

This invention relates to a digital computer. More particularly, it relates to methods, apparatus and systems employed in a novel digital computer. The computer according to the invention disclosed herein is particularly adapted to scientific and industrial applications requiring continual input and output of data in "real time" to and from the computer. Such computers are used for example in monitoring scientific experiments, in process and machine control, and in data transmission storage and retrieval. The machine is thus particularly adapted for real time processing of continually updated information rather than to the batched processing commonly employed by commercial business oriented computers.

Digital computers were originally conceived as batch processors of data. That is the data or information to be processed was read into the memory of the computer along with a program or sequence of instructions as to how the data or information was to be processed. The computer was turned on and the program performed, generating a new set of processed data or information which was then read out from the machine. Such machines were not adapted to process continually updated data, that is they were not capable of operating in real time. Much effort has been expended in recent years in designing computer systems which operate in real time.

In these computers an input/output register or registers are provided which can be connected according to a priority and interrupt scheme to one or more external devices. Data can then be read into the machine by loading the input/output register with the data. The data is then transferred to the machine memory at one or more addressed location. Similarly, data is read out of the machine from addressed locations in its memory by placing the data in the input/output register and connecting the input/output register to the appropriate external device. This is a form of time sharing. Each external device or set of external devices has a particular program which must be performed. When that communication is established between a set of such devices and the computer, the program required must be made accessible to the computer main memory. In large multi-terminal systems according to the prior art each program may be recorded in a mass memory. When communication is established with a terminal requiring a particular program, it must be read into the computer's addressed main memory before any servicing can take place. In the usually smaller dedicated scientific and central computers of the prior art all programs are stored in the main memory and each is a subroutine of a so called "executive program." The executive program itself is usually complex in order to provide for the many interrupts and jumps between the various subroutines. Programming such computers is very difficult, requires long hours of very talented programmer time, long hours of "debugging," and the resulting programs require large amounts of expensive main memory.

Those skilled in the art will realize that the computer's main memory at the state of present technology is usually a core memory. Integrated circuit memories may soon come into greater use. The main memory is that portion of memory which is randomly accessible, and each register or storage location for a computer "word" is addressed and accessible to the central processing unit of the computer in substantially equal time.

SUMMARY OF THE INVENTION

In the computer disclosed herein two major difficulties of the prior art approach are overcome. In the prior art all data must pass through an input/output register and be placed in addressed locations in the main memory before processing. This not only takes time; in that the data must be moved from the external device to the input/output register, and then to the memory location, but takes the time of the central processing unit of the computer which must control the transfer at least from the input/output register to the addressed memory location and in many cases the loading of the input/output register from the external device and vice versa. According to the present invention this difficulty is completely overcome by assigning to each external device a register or portion thereof which has a memory address and is in fact addressed according to the common scheme and part of the main memory of the computer. Thus the data in any addressed external register may be transferred to any other addressed external register or internal addressed memory location or internal special registers such as an arithmetic buffer register without any intervening addressing step. Also, the external information which may change at any time can immediately cause a change in the data stored at the addressed external register without intervention of the central processing unit. Thus the data manipulated by the central processing unit at its addressed memory locations is always current. Similarly the instant the central processing unit has generated output data in accordance with the program, this is stored in an addressed memory location which is an external register. Therefore the output data is immediately available to the external device. Again, this is without any additional manipulative step by the central processing unit in transferring the data from its final addressed location in the program when the program has completed operating on the data to an input/output register and then to an external device as in the prior art.

The second major problem solved by the computer of the present invention is that found in prior art time sharing systems as previously described. Each time one or more external devices in a group requires servicing by a special subroutine, the central processing unit must interrupt its current subroutine at an appropriate place and then start the subroutine and go through it. The central processing unit must return to its original place in the previously current subroutine or start the program over at some arbitrary point. If it starts the program over at some arbitrary point, there may well occur situations in which certain parts of the program are not performed often enough leading to long average response times to certain groups of devices or events. If, on the other hand, provision is made to return to the program where interrupted, rather elaborate program provisions have to be made and many addressed locations in the main memory utilized to store this information. Considering the fact that a program may well have interrupts of interrupts of interrupts, that is subroutines that are interrupted by subroutines which are interrupted by subroutines, large portions of the program and memory may be required to store the special programming instructions to handle such interrupts.

According to the scheme of the present invention, this difficulty is largely overcome by not providing special nonaddressed hardware registers for performing the functions of the accumulator, program counter, and program counter save; but by rather having addressed main memory locations perform these functions which are specified by a single unaddressed machine pointer hardware register. According to this scheme each routine and important subroutine is assigned its own accumulator, program counter, and program counter save register in the addressed main memory. By specifying a program counter address in the machine pointer hardware register the "dedicated machine" formed by the thus addressed accumulator, counter, and program counter save register becomes operative to perform the desired subroutine.

Immediate interruption of the dedicated machine is also permissible. The information in its program counter, accumulator, and program counter save registers remains undisturbed in the main memory. The machine enters a catatonic state, and can be reactivated at the same point in its programmed operation by merely replacing the address of the program counter in the machine pointer.

As explained in detail below, the new scheme of the present invention is made very powerful by providing two or more levels of priority. As a result, equal numbers of storage locations in several devices can have the same address. When addressed by the central processing unit, only the storage location in the device assigned the corresponding highest priority level will be addressed. Thus, registers connected to the external world may be caused to be addressable only when active, e.g., when input or output information has been updated.

Also according to the invention, a program instruction can be stored in an external addressed register and this instruction thereby inserted into a program sequence. This provides a powerful means for modifying a program in accordance with an event in the external world in real time.

In order to accomplish the above results, the computer disclosed herein provides a half duplex transfer bus to which all registers are directly connected for the transfer of data. The control unit of the computers sequences one-way transmission between the registers to accomplish all operations of the machine. The machine disclosed herein provides a single master timing cycle embodying three timing states. All machine cycles are performed in accordance with the master timing cycle.

Perhaps the most powerful consequence of all of the scheme of the computer disclosed herein is that another computer can be connected to an addressed external register and the second computer is thereby directly addressable according to the common addressing scheme of the first computer. Thus, the second computer can provide for the performance of special subroutines which are too large to be stored in the main memory of the computer, for the computation of tables and the like, for the addition of large numbers of addressed or unaddressed (so called mass memories) memory locations above that provided by the original computer designed; and the special manipulation of data before transfer to or from the first computer. An example of the latter is the assembly of teletype words or lines, checking them for special errors, parity and the like before they are transferred to or from the main computer. Thus the invention provides an architectural scheme whereby many small computers may be connected in parallel and perform data processing heretofore thought possible only with machines initially designed as large scale.

OBJECTS OF THE INVENTION

It is therefore an object of the invention to provide a digital computer.

Another object of the invention is to provide a digital computer for real time data processing applications.

Still another object of the invention is to provide a general purpose digital computer of the above character.

A further object of the invention is to provide a digital computer of the above character conveniently adapted to special purpose use and conveniently expandable to any required size.

A still further object of the invention is to provide a digital computer of the above character adaptable to process control, machine control, data communication, data storage and retrievable, data monitoring and the like.

Another object of the invention is to provide a digital computer of the above character having a relatively low average response time, providing for convenient program interrupts, and conveniently providing for the execution of subroutines.

Still another object of the invention is to provide a digital computer of the above character which eliminates needs for input/output instructions and special logic interfaces.

Yet another object of the invention is to provide a digital computer of the above character which is conveniently programable and conservative of main memory.

A further object of the invention is to provide a digital computer of the above character in which program instructions may conveniently be loaded into the machine in response to external events.

A still further object of the invention is to provide a digital computer of the above character which may conveniently be manufactured of conventional components and in which the choice of conventional components for special purpose situations may be made without changing the general architecture of the machine.

Other objects of the invention will in part be obvious and will in part appear hereinafter.

The invention accordingly comprises apparatus embodying features of construction, combinations of elements and arrangements of parts; a system comprising the means, the features of operations and combinations of functions, and relation of one or more of such operations and functions with respect to the each of the others; and methods comprising several steps and the relation of one or more of such steps with respect to the others, all as exemplified in the following detailed disclosure.

The scope of the invention is indicated in the claims.

For a fuller understanding of the nature and objects of the invention reference should be had to the following detailed description taken in connection with the accompanying drawings, in which:

FIG. 1 is an overall block diagram of a digital computer according to the present invention;

FIG. 2, comprising FIGS. 2A, 2B and 2C which may be fit together to form FIG. 2 as shown in FIG. 2D, is a more detailed overall block diagram of the digital computer of FIG. 1, partially in schematic form, and showing the control, data, and timing signals interconnecting the major elements of the computer;

Figure 1:
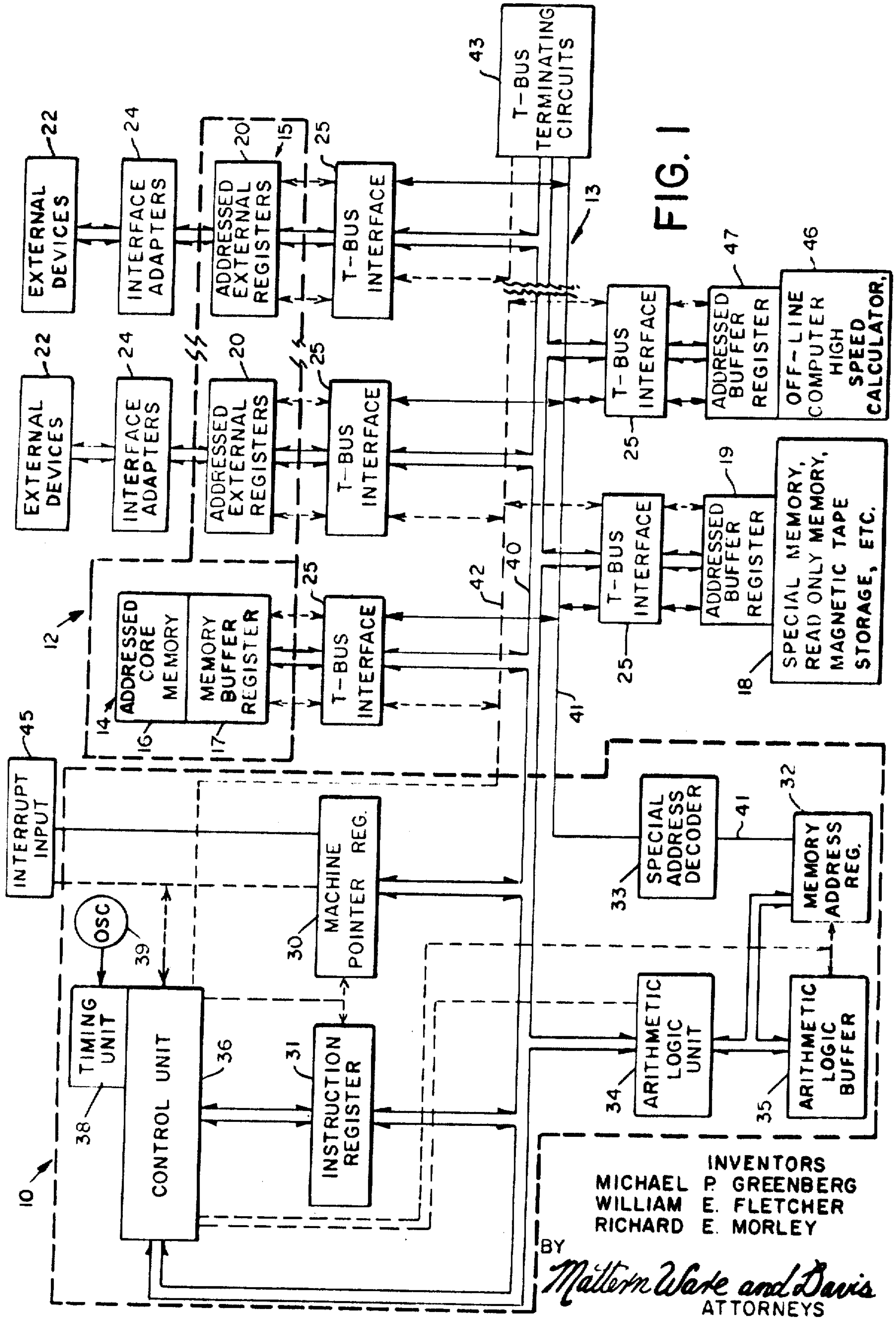
Figures 6C, 6D:
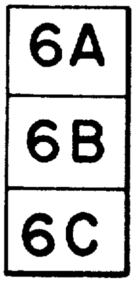
Figure 8:
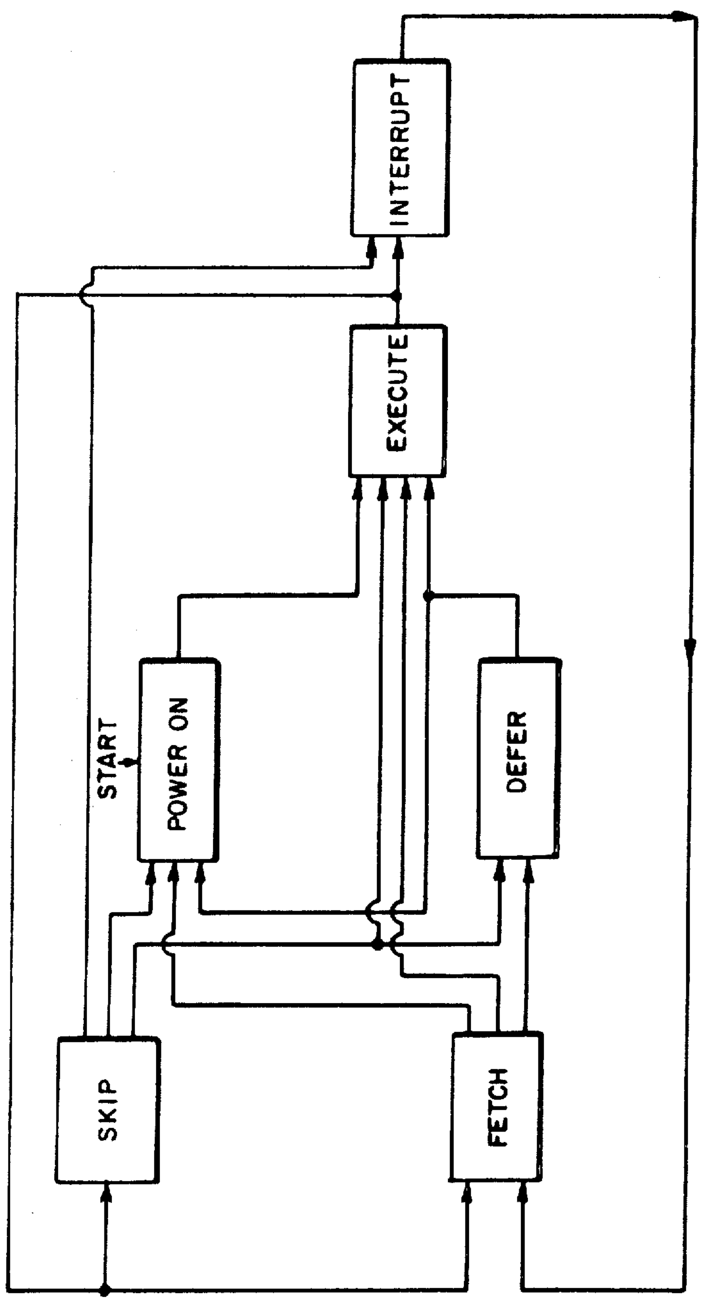
Figure 9:
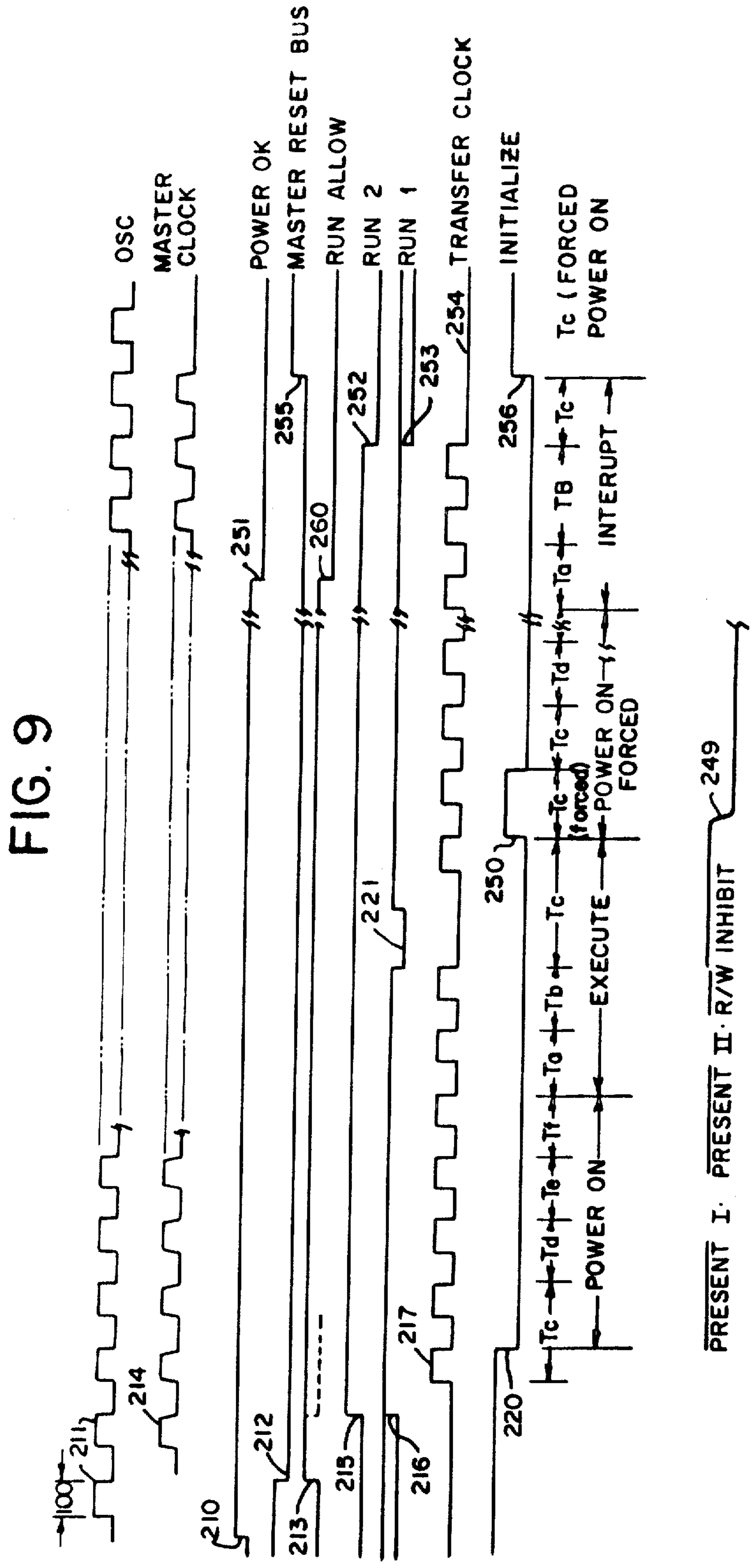
Figure 10:
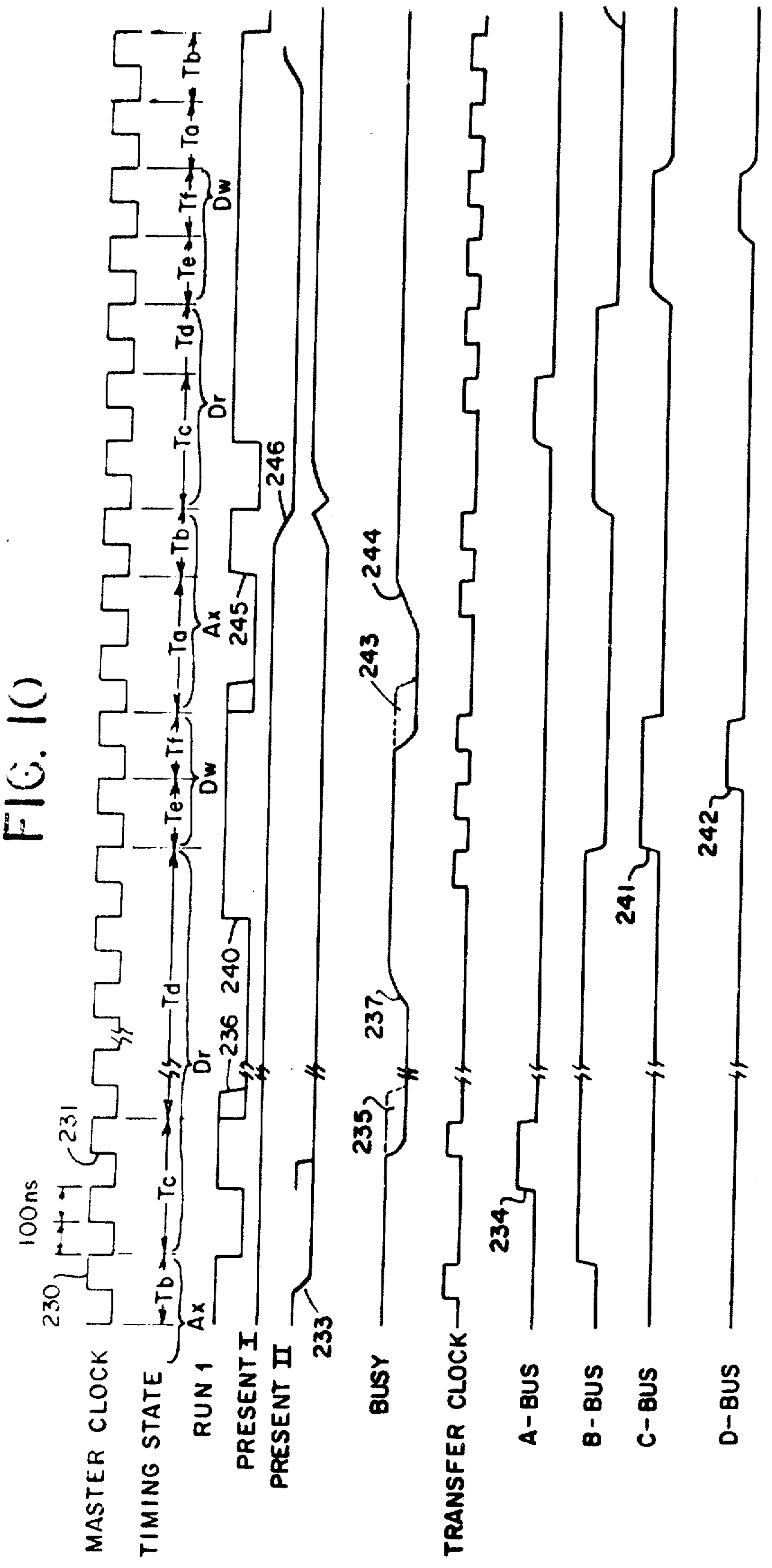

FIG. 6A, comprising FIGS. 6A, 6B and 6C which may be placed together to form FIG. 6 as shown in FIG. 6D, is a table of memory reference instructions provided by the computer of FIG. 1;

FIG. 7, comprising FIGS. 7A and 7B which may be fit together as shown in FIG. 7C, is a table of two groups of operate instructions provided by the computer of FIG. 1;

FIG. 8 is a state diagram of the computer of FIG. 1, showing its operating modes and the allowed transitions therebetween;

FIG. 9 is a timing diagram of the signals occurring during startup and shutdown in the computer of FIG. 1; and, FIG. 10 is a timing diagram of information transfer signals occurring during typical read-write transfers in the computer of FIG. 1.

The same reference characters refer to the same elements throughout the several views of the drawings.

GENERAL DESCRIPTION

A block diagram of a general purpose computer system according to the invention is shown in FIG. 1. Generally, the computer system comprises a central processing unit 10, a memory 12, a transfer bus 13, and means for inter-communication and intracommunication among the central processing unit, the memory, and with devices in the external world. The communication means include data transmission lines indicated by double lines, address transmission lines indicated by solid single lines, and control lines indicated by broken lines.

MEMORY

The memory 12 is divided into an internal memory 14 and an external memory 15. The internal memory 14 comprises first a magnetic core memory storage device 16 and an associated memory buffer register 17. Additional storage devices such as a read only memory, magnetic drum or magnetic tape storage devices, or other special memory, may also be provided to make up a total internal memory for the computer. Such other storage devices are optional to the embodiment of this disclosure, and are therefore indicated at 18 in FIG. 1, outside of the designated internal memory 14. A buffer register 19 is provided for the devices 18.

The external memory 15, of the total memory 12 comprises one or more external registers 20. The external registers 20 communicate on a real time basis with external devices in the real world, such as switches, relay coils, sensing devices, timers, and the like. The real-world external devices are shown at 22. Signals loading and unloading registers 20 from the external devices are conditioned to proper voltage and current levels by interface adapters 24, which adapters and external registers comprise the input-output inter face for the general purpose computer.

One addressing scheme embraces the total memory 12. The external registers 20 comprising the external memory 15 are accessible in the same manner as storage locations in internal memory 14. When access to an addressed storage location in core memory 16 is requested, the core memory responds and appropriately writes the data in the storage location onto the transfer bus 13 or reads it into the storage location therefrom. Similarly, when access to an addressed storage location comprising one of the external registers 20 is requested, the external register responds by appropriately providing or accepting the data. The central processing unit 10 does not distinguish between internal and external memory.

Each of the several different storage devices comprising the total memory 12 may contain a storage location with an address identical to the address of a storage location in one of the other storage devices. It is desirable for orderly operation of the computer that only one storage location be predictably accessed for each address. There is therefore a potential conflict as to which of the several storage devices containing an identically addressed storage location will respond to a common access request. The resolution of this potential conflict is effected by assigning a unique priority to each of the several storage devices. The priority assignments operate such that the storage device having the highest priority assignment and containing the identically addressed storage location will respond when access to that addressed storage location is requested. If the highest priority storage device containing the identically addressed storage location is absent from the total memory, e.g., physically not present, temporarily disconnected, or otherwise disabled, then the next highest priority storage device containing the identically addressed storage location will respond.

In the computer of this disclosure there are two priorities, hereinafter Priority I and Priority II. Priority I is assigned to the external memory 15 comprised of external registers 20 in FIG. 1, and the Priority II designation is given to the magnetic core storage device 16 comprising internal memory 14 in FIG. 1. As mentioned above, the total memory may be expanded by the addition of other data storage devices 18; however, these storage devices may not violate the priority assignment scheme if predictable accessing of memory is to be achieved. Therefore, there must be a number of priorities equal to the number of devices incorporated into the total memory which contain identically addressed storage locations.

Only the identically addressed storage location in the storage device with the highest priority will be accessed when access to an identically addressed storage location is requested. Access to the other storage locations with the common address cannot be accomplished while a higher priority storage device is active, and the storage locations in a higher priority device in effect block out, or replace in the overall addressing scheme the portions of a lower priority storage device containing identically addressed storage locations. The contents of the blocked storage locations in a lower priority device are not disturbed, and the blocked storage locations are available for storage of information not necessary to the current operation of the computer. Such information can be made available by disconnecting or otherwise disabling the higher priority storage device.

An example of efficient use of the priority addressing scheme and the latent storage capability of the blocked portions of the Priority II core memory is to connnect a Priority I storage device to the computer, where the connected device has addresses identical to some lower numbered addresses in the core memory. The Priority I device may contain a program for loading the higher numbered address locations in the core memory. After completion of loading the higher numbered addresses of the core storage, the Priority I device may be shifted to block some higher numbered previously loaded addresses in the core memory, and may then be used to load the previously blocked lower numbered addresses. When the Priority I loading device is removed, the entire core memory has been loaded with information other than a loading program.

The priority I loading device may also be connected to the computer in place of the external devices at the external registers. The desired program and data information may then be loaded into the core memory. The computer is then prepared to perform its desired operations by reconnecting the external devices at the external registers. No core memory storage space has been devoted to a seldom used loading program.

In the computer shown in FIG. 1, additional external registers 20 may be connected to accommodate the inputs and outputs from a greater number of external devices. When the operation being performed by the computer requires a fewer number of inputs and outputs to the external world, some of the registers 20 may be disconnected from the computer system thereby allowing access to the core memory locations which they were blocking. Thus, there is a great deal of flexibility in the number and type of operations which the computer can successfully be adapted to perform. In the computer disclosed in detail herein, 16 external register cards are provided, with each register card comprising two individually addressed sixteen bit external register terminals.

All storage devices incorporated in the computer system must be compatible with the T-Bus interfaces 25 for connection to the computer. No restriction is placed on the memory cycle time of a storage device as the computer is asynchronous and will pause until the particular storage device has completed a read or write cycle before proceeding to the next operating step. A practical limit of 1,024 storage locations is imposed because ten bits of a 16 bit word are devoted to address. Expansion beyond 1,024 storage locations may be accomplished by designating one external register as a memory address register for an auxiliary memory, and one external register as a memory buffer register therefor.

There are several advantages achieved by combining internal and external storage into one total memory unit. All storage devices are thereby accessible in accordance with one general scheme of addressing. A machine cycle performing an input-output instruction transferring data from external registers to storage devices is no longer necessary. Equally fast access to information stored in either core memory or external registers is provided. The information transferred to and from external devices through the external registers is updated on a real time basis, permitting faster response by the computer to changes in the external world.

CENTRAL PROCESSING UNIT

The central processing unit 10 has the capability of fetching instructions stored in the memory 12 and manipulating information also stored in memory 12 in accordance with those instructions. The central processing unit 10 comprises a machine pointer register 30, an instruction register 31, a memory address register 32, a special address decoder 33, an arithmetic logic unit 34 and an associated arithmetic logic buffer register 35, a control unit 36, a timing unit 38, an oscillator 39, and appropriate lines for the transmission of signals within the central processing unit.

The machine pointer register 30 eliminates the need for hardware registers to perform the well known functions of a program counter register, an accumulator, and a program counter save register. In the computer according to the invention, these registers comprise three consecutive predetermined addressible storage locations, preferably an internal memory 14. The machine pointer register 30 is loaded with the address of the first such storage location, which is the program counter register. The addresses of the accumulator and program counter save register can be determined by adding one or two respectively to the address in the machine pointer register 30.

Using storage locations for the program counter register, accumulator, and program counter save registers, and "pointing" to them with a machine pointer register permits the computer to perform as a multiple set of computers or submachines existing within and sharing the same hardware elements. The permissible number of such submachines is limited only by available memory space.

This is a desirable feature as each submachine may perform a particular control or processing function and can be activated at any time, although only one submachine can be active at any given time. In order to accomplish this multiple independent capability, each submachine is provided with its own program counter register, accumulator, and program counter save register in storage. Programs are designed and loaded to accomplish the desired control functions, and each program is run in conjunction with the remainder of the computer using one set of registers in internal storage comprising a submachine.

The computer can be switched from submachine to submachine, and consequently from control function to control function, simply by placing the address of the program counter register of the desired submachine in the machine pointer register 30.

Switching from one submachine to another may be accomplished internally by proper design of the several programs and submachine functions. For instance, the computer can comprise a given number of submachines performing separate control functions in a predetermined given order. The address in the machine pointer register can be changed internally through an instruction to load the machine pointer register with the contents of a specified internal storage location, where that internal storage location is the program counter register for the submachine to perform the next desired function.

The computer can also be changed to a different function by placing the address of the program counter for the submachine to be activated on an interrupt input facility 45 and signaling an interrupt request. An interrupt can be granted at any point in the programmed sequence of operation of a submachine because the interrupted submachine remains intact and dormant in storage. Very minor delays in granting an interrupt allow completion of transfers in progress. The information in the submachine's program counter, accumulator, and a program counter save register is not lost, and the interrupted submachine can be activated and continue its operation by replacing the address of its program counter in the machine pointer register either after the interrupt operation is completed or in a normal sequence of operation of the several submachines. Interrupting a conventional programmed routine or subroutine requires three machine cycles to store in memory the information in the hardware program counter register, accumulator, and program counter save register, thereby preventing loss of that information. After the interruption, three additional machine cycles are required to retrieve that information from memory in preparation for continuing the program. The alternative is to allow interrupts only at the end of a programmed routine or subroutine. The delay this may occasion can be lengthy and detrimental if fast response is necessary.

Initially designating internal storage locations to perform the functions of a hardware program counter register, accumulator, and program counter save register to comprise a submachine as described above achieves the significant advantage of almost immediate response to an interrupt request. Further savings are realized by the elimination of two hardware registers. Programming is simplified in that program linking or instruction linking within a program is not necessary, except in the case of subroutines common to several programs.

In the computer of this disclosure, it is required that one submachine have its program counter register stored at address 040 octal. This is necessary to comply with the start up procedure described herein.

The memory address register 32 receives the address of a storage location to be accessed. The memory address register holds this address and presents it to all storage devices over address lines 41. The output from the memory address register passes through the special address decoder 33, which recognizes and partially decodes selected addresses, and signals the particular storage locations with those addresses over special address lines also comprising address lines 41. This accomplishes a very fast accessing of the selected storage locations with a minimum amount of additional signal processing or decoding at the device containing the selected storage locations. In the embodiment of FIG. 1, the external registers 20 are addressed by the special address lines, and therefore the external registers require no address decoding capability beyond recognition of their individual addresses.

The instruction register 31 receives the instruction to be executed by the computer. The instruction register has the capability of separating the instruction word into those bits which contain instructions and those bits which contain addresses or data for delivery of those bits to the appropriate locations.

The arithmetic logic unit 34 performs all arithmetic operations which are specified in the available computer instructions which will be described below. All operations are carried out in parallel, and no storage is provided in the arithmetic logic unit. Transfers to the Memory Address Register 32 pass through the arithmetic logic unit wherein one or two may be added to facilitate addressing the accumulator or program counter save registers for a submachine.

Temporary storage for data during transfers and arithmetic operations is provided in the arithmetic logic buffer 35.

An oscillator 39 provides a uniform high frequency square wave for use in producing appropriate clock and control signals for operating the computer.

A timing unit 38 receives the square wave pulses from the oscillator and produces various timing pulses for operation of the computer.

A control unit 36 receives information from the other devices comprising the central processing unit and from the various devices connected to the transfer bus 13 and produces signals for proper operation of the computer in accordance with the information received. The control unit 36 specifies one of five operating modes in which the computer may exist. These five operating modes, discussed further herein, are: fetch/skip, defer, execute, interrupt, and power on.

TRANSFER BUS

The transfer bus 13, or T-Bus is the principal means of communication among the central possessing unit 10, the memory 12, the external devices 22 communicating with the memory 12, and the other devices connected to the computer system through one of the T-Bus interfaces 25. The T-Bus comprises data transmission lines 40, address transmission lines 41, control, timing, and status transmission lines 42, and a plurality of T-Bus interfaces 25 to which the various data, address, control, timing and status transmission lines are connected. The T-Bus interfaces 25 are adapted to readily and interchangeably receive various register hardware, such as the memory buffer register 17 and the external registers 20. The T-Bus further comprises T-Bus terminating circuits 43 which aid in rapidly changing the voltage levels on the various transmission lines.

The data lines 40 comprising the T-Bus are a half duplex bus to which the various devices are connected in parallel. Data is transferred from a first device connected to the bus to other devices on the bus by conditioning the first device so that it reads the data onto the bus, and conditioning the data destination devices to read the data from the bus. Only one data word may be transferred on the bus at any given time; however, that data may be retrieved from the bus by any other device connected to the bus and properly conditioned to receive the data, regardless of the position of that device on the T-bus.

Additional devices may be added to the computer system by connecting them in parallel to the T-Bus at one of the T-Bus interfaces. Examples of such devices are an off-line computer, high speed calculator, or the like, as shown at 46 of FIG. 1. A buffer register 47 is generally required for proper interfacing.

DETAILED DESCRIPTION

Figure 2A:
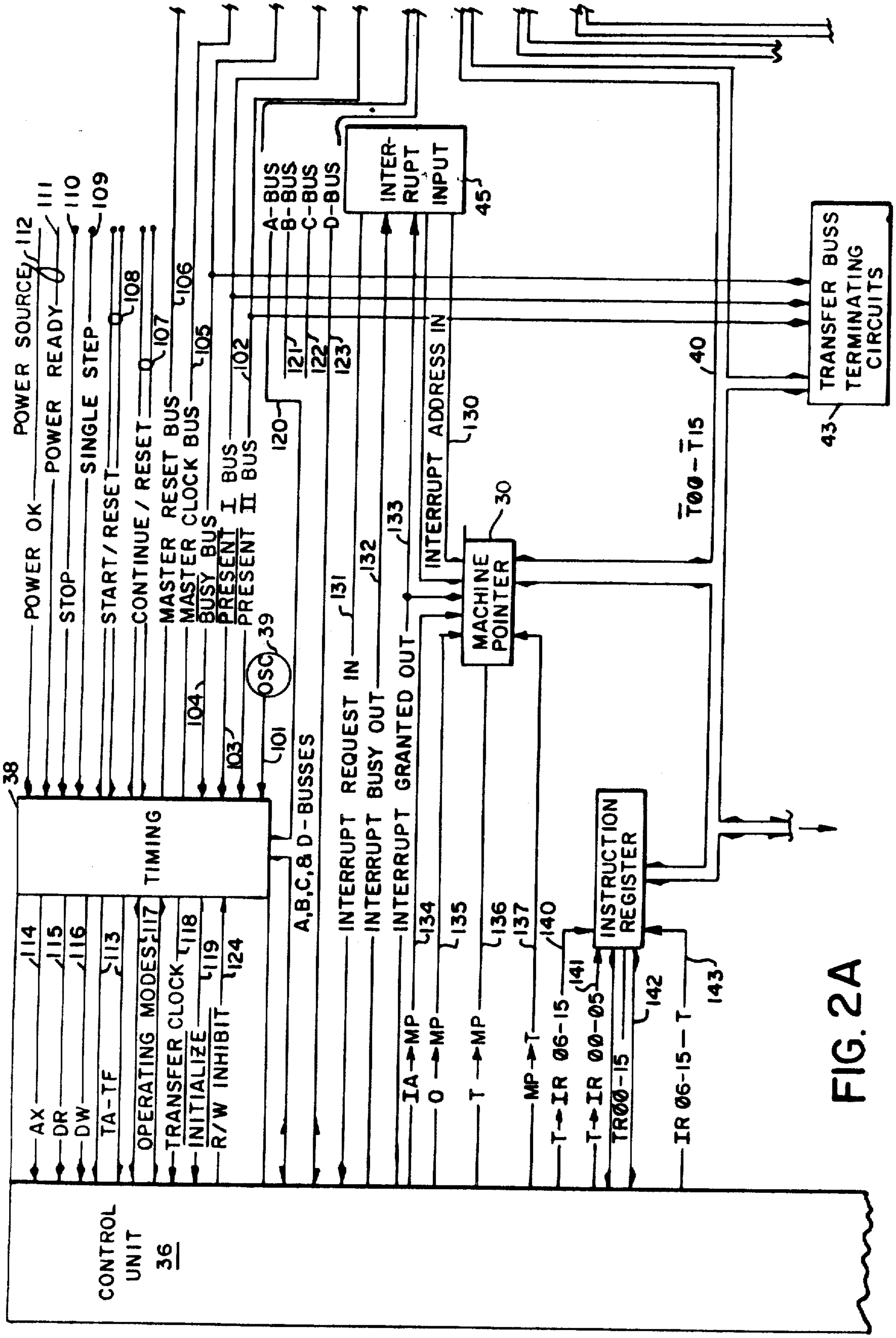
Figures 2B, 2D:
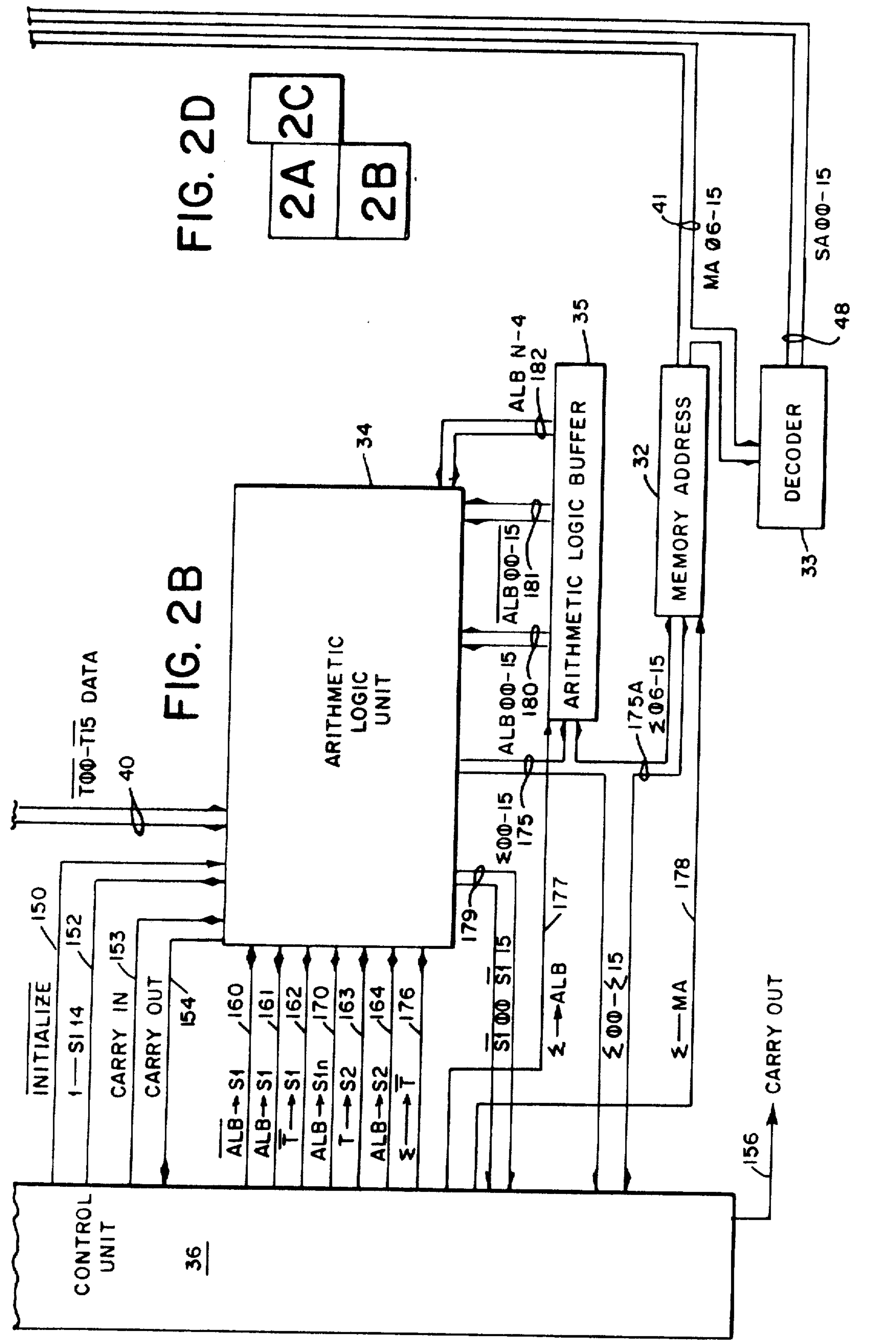
Figure 2C:
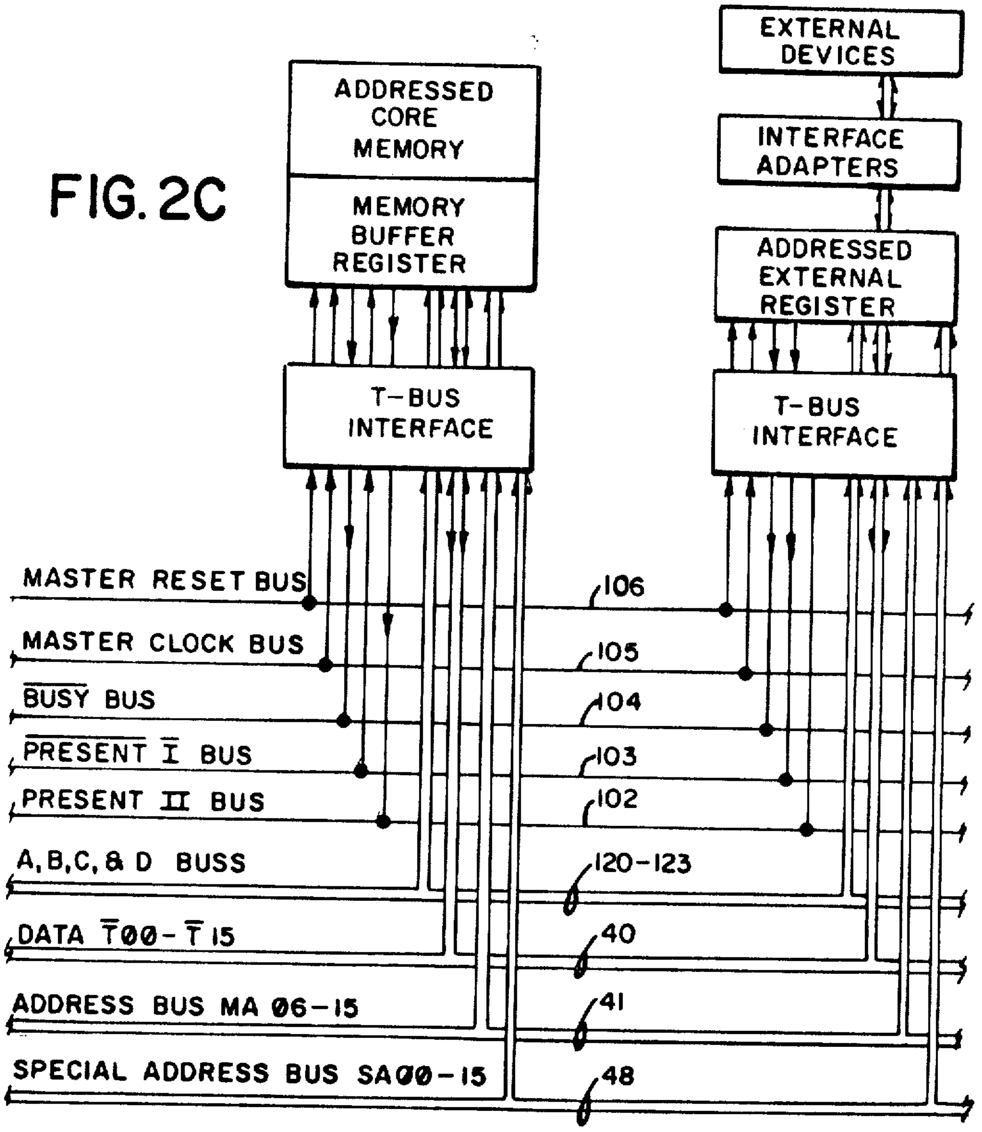

FIG. 2A, FIG. 2B, and FIG. 2C, assembled as shown in FIG. 2, present a detailed block diagram of the computer system of FIG. 1. The detailed block diagram shows the flow of data, timing, and control information among the components of said computer system.

The various signals are named in FIG. 2, and where the signal is normally transmitted in its complemented form a bar (——) appears over the name. It will be readily understood that a signal is transmitted in complemented form for reasons of logic design, and the appearance of a bar does not indicate the absence of the signal in FIG. 2.

The oscillator 39 produces a 5MHZ. square wave which is transmitted to the timing unit 38 over line 101. The timing unit 38 receives signals over a Present II Bus 102 and a Present I Bus 103. Devices with Priority I designations respond to access requests by changing the level of the Present I Bus. A change in the level of the Present II bus indicates the presence of a Priority II device capable of responding to an access request, and the absence of any Priority I device also capable of responding to that access request. The timing unit also receives a Busy Bus 104 signal from a synchronous memory device, such as core memory 16, connected to the T-Bus for indication of the completion of a read or write operation therein.

The timing unit 38 provides a Master Clock Bus 105 and a Master Reset Bus 106 to devices on the T-Bus 13 for accomplishing transfers of information between those devices and the T Bus.

The Continue/Reset line 107, Start/Reset line 108, Single Step line 109 and Stop line 110 are connected to the timing unit 38 from external pin connections. The user of the computer system may change the levels at the external connections by grounding the pins, and use this group of lines for maintenance purposes. For instance, grounding the Single Step line 109 and pulsing the Continue/Reset line 107 causes the computer to proceed through one machine cycle for each pulse of the Continue/Reset line, which is useful in debugging programs or locating malfunctions. Grounding the Stop line 110 shuts down the computer operation, and pulsing the Start/Reset line 108 returns the computer to its initial operation and start up procedure.

The Power Ready signal 111 and Power OK signal 112 are derived from a power source not shown, and are used by the timing unit to initiate running the computer when power reaches the proper operating levels, and to shut down the computer in an orderly manner without information loss in the event of power failure.

The function of the timing unit 38 is to provide the component timing pulses comprising one machine timing cycle of operation. The timing unit 38 divides the 5 MHZ. Square wave produced by the oscillator 39 into six timing sub states: $T_A$, $T_B$, $T_C$, $T_D$, $T_E$, and $T_F$, occurring in sequence. These timing substates are communicated to the control unit 36 over lines comprising the $T_{A-TF}$ Bus 113 in FIG. 2. The six timing substates $T_A$ through $T_F$ are grouped in pairs to form one of three timing states $A_X$, $D_R$, and $D_W$. Addressing of various devices on the T-Bus is accomplished during the $A_X$ state, and this state is comprised of the timing substates $T_A$ and $T_B$. $T_A$ has a duration of an arbitrary number of cycles of the basic clock or oscillator, and $T_B$ has a fixed duration of one such cycle.

In the $D_R$ state, the addressed storage device responds to the address and data is read from that device to the T-Bus from which the data is loaded into the appropriate registers within the central processing unit. The timing state $D_R$ is comprised of timing substates $T_C$ which lasts for two cycles of the basic clock, and timing substate $T_D$, which lasts for an arbitrary number of cycles thereof.

A data write operation returning data to the storage devices is initiated during the $D_W$ timing state. This state is made up of the timing substates $T_E$ and $T_F$, each of which have a one cycle duration.

The three composite states $A_X$, $D_R$, and $D_W$ comprise one machine cycle, and one machine cycle is required for the basic read write data transfer over the T-Bus. The timing unit 38 produces each of the three composite states, and communicates their existence over line 114 for state $A_X$ line 115 for state $D_R$, and line 116 for state $D_W$. All other operations, including the execution of instructions occur within the same general timing scheme. The machine cycles will be further discussed below in the discussion of the timing diagram of the computer.

The computer exists in one of six operating modes which are determined by the control unit 36. The operating modes are first a fetch/skip mode during which the address of the next instruction is determined by examining the contents of the program counter specified by the machine pointer register. That instruction is loaded into the instruction register during the fetch/-skip mode unless deferred addressing is specified, in which case a defer operating mode is entered to obtain and load the deferred address into the instruction register. Once the instruction register is loaded with the next instruction to be executed the machine enters the execute operating mode during which a sequence of data manipulation transfers and arithmetic operations are performed to properly carry out the instruction.

As mentioned previously, the user may change the contents of the machine pointer register by placing a new address for loading therein on the Interrupt Input 45 and requesting an interrupt. When this interrupt is granted, the machine enters an interrupt operating mode. A power on operating mode is established when the machine is first turned on, or when a storage device fails to respond to an address.

The existence of the computer in one of the states briefly discussed above has an effect on the signals produced by the timing unit 38, and therefore the existence of some of these states is presented to the timing unit 38 over an Operating Modes Bus 117 in FIG. 2.

The timing unit 38 also produces a transfer clock, communicated to the control unit 36 over line 118. The transfer clock comprises a series of pulses used in forming transfer pulses for loading and unloading the several components of the computer system. The timing unit 38 also produces an initialize signal carried on line 119. This signal is produced by the timing unit 38 after the timing unit is proceeding properly for use in setting the timing substate, operating mode, first instruction, and the like in starting the operation of the computer.

The control unit 36 decodes the programmed instructions and provides appropriate signals for accomplishing the data transfers and arithmetic operations necessary to carry out the instructions. Referring still to FIG. 2, the control unit produces signals controlling the transfer of information between the T-Bus data lines and addressed storage locations, these signals being carried on an A-Bus 120, a B-Bus 121, a C-Bus 122, and a D-Bus 123 comprising the T-Bus. The A-Bus 120 is also connected to the timing unit 38, as is a R/W inhibit signal 124 indicating that no read or write data transfers are to occur between the T-Bus and storage devices thereon during the operation being performed.

The next series of signals in FIG. 2 relate to the interrupt capability of the computer. The user places a desired interrupt address on terminals comprising the Interrupt Input 45. These terminals are connected to an Interrupt Address In Bus 130 for transfer to the Machine Pointer Register 30. The user signals his desire to interrupt over an Interrupt Request In line 131. The control unit acknowledges the request over an $\overline{\text{Interrupt Busy Out}}$ line 132, indicating that the interrupt request is being processed and the interrupt address should not be removed. When the control unit grants the interrupt, it signals the user over an $\overline{\text{Interrupt Granted Out}}$ line 133, which signal is also presented to the machine pointer register over an IA → MP line 134, which loads the interrupt address into the Machine Pointer Register 30.

The Machine Pointer Register 30 may be cleared by an O → MP signal 135 emanating from the control unit 36. Information on the T-Bus data lines 40 is read into the Machine Pointer Register by pulsing a T → MP line 136, and information is transferred from the Machine Pointer Register to the T-bus by pulsing a MP → T line 137. The machine pointer register is connected to the data lines 40 of the T-Bus as indicated in FIG. 2.

Still referring to FIG. 2, a similar set of signals controls the Instruction Register 31, which is also connected to the data lines 40 of the T-Bus. A signal $T \rightarrow IR_{06-15}$ carried over line 140 loads the Instruction Register with the last 10 bits of a 16 bit word, and a signal $T \rightarrow IR_{00-05}$, carried over line 141 loads the Instruction Register with the remaining first six bits of the word. The contents of the Instruction Register 31 are presented to the control unit 36 over a 16 line Instruction Bus 142. In the case of indirect addressing, the last 10 bits of the instruction word require further manipulation, and those bits are unloaded from the Instruction Register by a signal $IR_{06-15} \rightarrow T$ carried on line 143.

The Arithmetic Logic Unit 34, or ALU, is used to perform all the required data changing functions such as adding, subtracting, or comparing two numbers; complementing, shifting, or rotating a number; etc. All operations are carried out in parallel, and no storage is provided in the ALU. The Arithmetic Logic Buffer 35 provides temporary storage for data during transfer, arithmetic, and logic operations. Transfers to the Memory Address Register also pass through the Arithmetic Logic Unit. The control unit 36 provides signals directing the proper performance of the data changing functions.

The ALU 34 is connected to the data lines 40 of the T-Bus. The Arithmetic Logic Unit also receives the $\overline{\text{initialize}}$ signal described above over a line 150.

As discussed above, the accumulator and program counter save registers for a submachine are determined by adding one or two respectively to the contents of the Machine Pointer Register, which contains the address of program counter for that submachine. These additions are performed in the Arithmetic Logic Unit. The control unit provides a control signal $1 \rightarrow S1_{14}$ over line 152, which signal effectively adds two to the address by adding a 1 in the fourteenth bit position of the binary address word. Similarly, a "carry in" signal presented over line 153 forces a bit into the fifteenth position in the word being manipulated by the Arithmetic Logic Unit. This signal may be used to increment an address word and may also be used in performing a rotate left and for incrementing a number in two's complement arithmetic. The Arithmetic Logic Unit provides a "carry out" signal over line 154, which signal comprises the carry bit from an addition operation. This carry bit is useful in extended precision arithmetic to create a link bit, and the carry out signal from the control unit 36 is available to the user over line 156 for storing the link bit in a storage register.

The Arithmetic Logic Unit 34 has two "sides," and in performing an arithmetic operation between two numbers each number is presented to one of the sides. One of the numbers is normally stored in the Arithmetic Logic Buffer 35 prior to the arithmetic operation, and the other number is normally brought to the Arithmetic Logic Unit 34 over the data lines 40. The control unit 36 gates the complement of the contents of the Arithmetic Logic Buffer to side one of the Arithmetic Logic Unit by signalling over line 160, $\overline{ALB} \rightarrow S1$. Similarly, the contents of the Arithmetic Logic Buffer are transferred to side one of the ALU by signalling over line 161, ALB → S1, and the complement of the information on the data lines 40 is gated to side one of the Arithmetic Logic Unit by signalling over line 162, $\overline{T} \rightarrow S1$. The T → S2 signal carried over line 163 gates the data information on the T-Bus to side two of the Arithmetic Logic Unit, and the signal ALB → S2 carried over line 164, gates the contents of the Arithmetic Logic Buffer to side two of the ALU.

The signal $ALB_{N-4} \rightarrow S1_N$, carried over line 170, instructs the Arithmetic Logic Unit to perform a rotate four right operation on the contents of the Arithmetic Logic Buffer.

The result of the operations performed by the Arithmetic Logic Unit appear on the Σ 00 – Σ15 Bus 175. These results are gated back to the data lines 40 of the T-Bus by the signal $\Sigma \rightarrow \overline{T}$, which signal is presented to the Arithmetic Logic Unit over line 176. The results may also be loaded into the Arithmetic Logic Buffer by the signal Σ → ALB carried over line 177. The Σ00 – Σ15 Bus is, of course, connected thereto.

Addresses loaded into the Memory Address Register are gated through the Arithmetic Logic Unit as described above. Comprising only 10 bits, an abbreviated $\Sigma_{06-15}$ Bus 175 A is provided for this purpose. The memory address register is loaded by the signal Σ → MA carried over line 178.

The next step in the operation of the computer is often conditioned on the result of an arithmetic operation. Therefore, the $\Sigma_{00-15}$ Bus 175 is presented to the control unit 36, as is a $S1_{00}$–$S1_{15}$ Bus 179 which carries the information from side one of the Arithmetic Logic Unit for comparison purposes.

In accordance with the above discussion, the contents of the Arithmetic Logic Buffer are presented to the Arithmetic Logic Unit over a $ALB_{00}$–15 Bus 180, and the complement of the contents the ALB are also presented over an $\overline{ALB}_{00-15}$ Bus 181. The contents of the Arithmetic Logic Buffer rotated four bits to the right are also presented to the Arithmetic Logic Unit over an $ALB_{N-4}$ Bus 182.

The address stored in the Memory Address Register 32 is presented to devices on the transfer bus over an Address Bus $MA_{06}$–$MA_{15}$ 41. The contents of the Memory Address Register are also presented to the Address Decoder 33 for initial decoding and presentation to preselected positions on the transfer bus as described above. These preselected locations are addressed by the special address bus $SA_{00}$–$SA_{15}$ 48.

Referring now to FIG. 2C comprising the detailed block diagram of FIG. 2, there is shown an Addressed Core Memory 16 and its associated Memory Buffer Register 17. There is also shown External Devices 22, interfaced adapters 24, and an addressed external register 20. These devices are connected to the transfer bus 13 at the T-Bus Interfaces 25.

The Transfer Bus 13 comprises first the Special Address Bus $SAB_{00-15}$ numbered 48 and emanating from the decoder 33. The regular Address Bus $MAB_{06-15}$ numbered 41 is also a portion of the T-bus 13, as are the Data lines $\overline{T_{00}}-\overline{T_{15}}$, shown at 40. The transfer Bus further comprises the Master Clock carried over line 105, the Master Reset Bus line 106 carrying information relating to power failure, and the four buses controlling the transfer of data between the devices on the T-Bus and the Data lines 40 thereof. These buses are the A-Bus 120, the B-Bus 121, the C-Bus 122, and the D-Bus 123.

The $\overline{\text{Present I}}$ signal carried over line 103, $\overline{\text{Present II}}$ signal 102, and $\overline{\text{Busy}}$ signal carried over line 104 permit devices connected to the T-Bus to communicate their status to the Central Processing Unit, as will be further discussed herein.

As shown in FIG. 2, each T-Bus Interface 25 has available all of the lines comprising the T-Bus. The Addressed External Register 20 receives the following signals therefrom: the Special Address Bus 48, the Data lines 40, the A, B, C, and D-Buses 120–123, the Master Preset Bus 106, and the Master Clock 105. The Addressed External Register 20 does not sample the regular Address Bus 41 as it is a Priority I device with its address previously partially decoded by the Decoder 33. Some address external registers may not have a predecoded address, and require the Address Bus for accessing.

The Addressed External Register provides to the T-Bus a $\overline{\text{Present I}}$ signal 103 and a $\overline{\text{Busy}}$ signal 104.

The Buffer Register 17 of the Addressed Core Memory 16 receives the same signals as the External Device, except that it samples the regular Address Bus 41, and the $\overline{\text{Present I}}$ line 103. The Memory Buffer Register returns to the T-Bus signals over the $\overline{\text{Present II}}$ line 102 and $\overline{\text{Busy}}$ line 104.

The External Devices 22 receive and transmit data to the Addressed External Register 20 over a continuation of Data lines 40. The Interface Adapters 24 condition the data to proper voltage levels, making the External Devices compatible with the integrated circuit flip-flops comprising the Addressed External Register 20.

If access to a storage location with an address common to both the Addressed External Register 20 and the Addressed Core Memory 16 is requested, the Addressed External Register responds by signalling over the $\overline{\text{Present I}}$ 103 signifying that a Priority I device contains the address and is ready to respond. The addressed Core Memory 16 is also capable of responding and would normally signal over the $\overline{\text{Present II}}$ bus. However, the Memory Buffer Register providing the $\overline{\text{Present II}}$ signal samples the $\overline{\text{Present I}}$ Bus, and detects when a $\overline{\text{Present I}}$ signal is generated by the Addressed External Register. The Memory Buffer register is thereby prohibited from producing its $\overline{\text{Present II}}$ signal, therein providing the mechanism for a priority choice.

DATA AND INSTRUCTION WORDS

Figure 3:
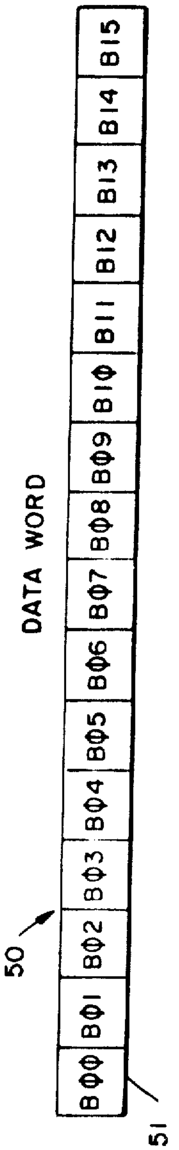
FIG. 3 is a diagram of a data word used in the computer of FIG. 1.
Figure 4:
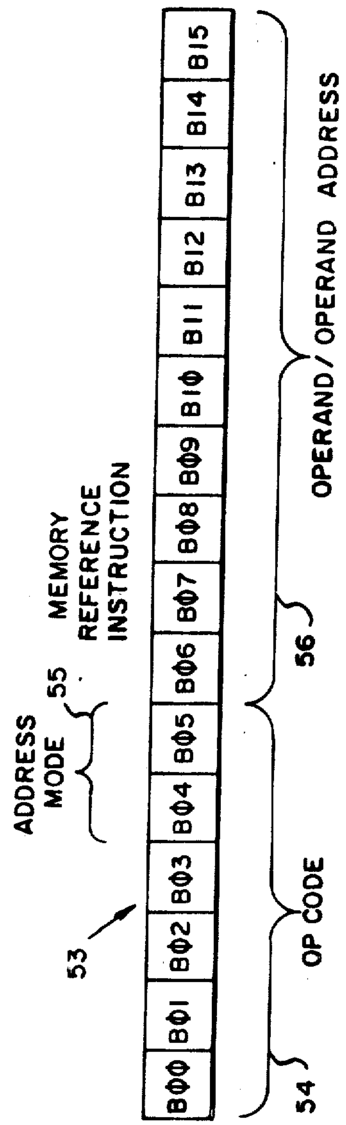
FIG. 4 is a diagram of a memory reference instruction word used in the computer of FIG. 1.
Figure 5:
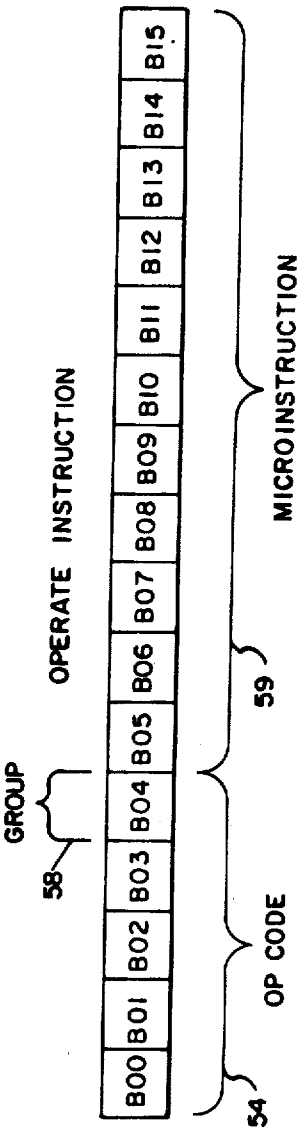
FIG. 5 is a diagram of an operate instruction word used in the digital computer of FIG. 1.

The computer has the capability of manipulating data in accordance with a sequence of instructions. Both data and instruction words are comprised of 16 bits. FIG. 3, FIG. 4, and FIG. 5 illustrate the permissable configurations of the words.

A Data Word 50 is shown in FIG. 3. The 16 bit data word can represent numbers in the range $$-(2^{15-1})_x N_x 2^{15}$$

binary, or −32,767 to 32,768 decimal, stored in two's complement form with the first bit 51, B00, indicating the sign of the number. The sign bit 51 is a "0" for numbers greater than or equal to zero, and a "1" for negative numbers.

The instructions for the computer are either Memory Reference Instructions as shown in FIG. 4, or Operate Instructions as shown in FIG. 5. A Memory Reference Instruction word 53 is divided into three parts: Six bits shown at 54 designating an Op Code for the instruction; two bits shown at 55 of those six designating one of four Address Modes; and ten bits indicated at 56 comprising either an operand or the address of an operand. An Operate Instruction word 57 shown in FIG. 5 is comprised of five bits designating an Op Code 54, and one bit 58 of the five designating one of two groups of Operate Instructions. The remaining eleven bits are used to specify an operate micro-instruction 59.

The instructions available to the programmer using the computer are presented in FIG. 6 and FIG. 7. FIG. 6 is comprised of FIG. 6A, 6B, and 6C assembled as shown, and FIG. 7 is comprised of FIG. 7A and 7B, also assembled as shown.

The first column of FIG. 6 with the heading "Instruction" lists the names of the several Memory Reference Instructions. The names of the instructions are generally descriptive of the operation which the instruction performs, as will become apparent from the discussion herein. The "mnemonic" for the instruction, listed in column 2 of FIG. 6, provides a convenient shorthand method of referring to the instruction. The first three letters of the mnemonic are generally derived from the name of the instruction. The space following the first three letters is used to indicate one of four addressing modes. These four addressing modes are direct addressing, specified by the absence of a letter in the second position of the mnemonic, indirect addressing, specified by an I, immediate positive addressing, specified by a P, and reverse addressing, specified by an R. The "X" appearing in the mnemonic represents the remaining bits of the memory reference instruction word.

In the direct addressing mode, the last ten bits of the Memory Reference Instruction word comprise an Operand Address 56, and the Operand is fetched from that address. When indirect addressing is specified, as indicated by an "I" in the mnemonic, the last ten bits of the Memory Reference Instruction word are the address of a storage location, and the last ten bits of the contents of that storage location contain the address of the operand. Only one level of indirect addressing is permitted.

In the immediate positive addressing mode, indicated by the appearance of a "P" in the mnemonic, the last 10 bits of the instruction word become the Operand thereof. In the immediate positive mode the first six bits of the Operand are considered to be zeros.

The fourth addressing mode is reverse addressing, indicated by the appearance of an "R" in the mnemonic. In the reverse addressing mode the last ten bits of the construction word are the operand address. However, unlike the first three addressing modes, the result of the instruction is returned to the operand address rather than being stored in the accumulator.

Not all instructions are performed in all four addressing modes.

The next column in FIG. 6 lists the Op Codes for the various instructions. Referring now to FIG. 4, the Op Code 54 comprises the first six bits of the Memory Reference Instruction, with bits 04 and 05 indicating the Address Mode 55. The numerical Op Codes of FIG. 6 for each instruction are derived by grouping the first six bits as follows: group one, bit B00; group two, bits B01, B02, and B03; group three, bits B04 and B05. The values of the bits in each grouping are converted to their octal equivalents to obtain the numerical Op Code. Bit B06 of the Memory Reference Instruction word is uniformly considered to be a zero and added to the third group for the purpose of this conversion, although it in fact may not be.

The transfers of information occurring upon performance of the memory reference instructions are shown in column 4 of FIG. 6. The symbology of the result has the following meanings: "X" refers to the contents of a storage location with the address X; and "(X)" specifies the contents of a storage location with an address given by the contents of the location with the address X. An arrow indicates a transfer of information, " V " indicates an inclusive OR operation and an " Λ " indicates a logical AND operation. The other symbols, such as equal, unequal, plus, and minus have their ordinary meanings.

According to the above discussion, FIG. 6 is interpreted as follows. Instruction 1a) Deposit Accumulator, has a mnemonic Dac X. The first six bits of the Deposit Accumulator instruction word are all zeros, and therefore the Op Code is 000. When the six zero bits are presented to the computer as an instruction, the computer will perform the transfer (MP+1) → X where MP is the address in the Machine Pointer Register, and consequently MP+1 is the address of the accumulator for the submachine in operation. Instruction 1a) is in the direct addressing mode. Therefore, the result of the Deposit Accumulator instruction in the direct addressing mode is that the contents of the accumulator are deposited in the storage location with the address X.

Instruction 1b) is Deposit Accumulator in the indirect addressing mode, indicated by both the "I" in the mnemonic and the "4" in the last digit of the Op Code. The result of the instruction 1b) is that the contents of the accumulator are deposited in the storage location with the address specified by the contents of the storage location with the address X.

Instruction 2a) Deposit Program Counter Save, has the mnemonic DPS X and the Op Code 002 in the direct addressing mode. When presented with this instruction, the computer deposits the contents of the storage location with the address MP+2 in the storage location with the address "X" specified by the last 10 bits of the memory reference instruction word. As noted above, the storage location with the address MP+2 is the program counter save register for the submachine currently in operation.

The first instruction in the immediate positive addressing mode is one of the Load Accumulator instructions. Instruction 3a) is Load Accumulator in the direct addressing mode, and has a mnemonic LAC X and Op Code 010. Performance of instruction 3a) transfers the contents of the storage location with the address X to the storage location with the address MP+1. Instruction 3c) is Load Accumulator in the immediate positive addressing mode, which instruction has the mnemonic LAC P X and Op Code 012. The result of the instruction 3c) differs from the result of the instruction 3a) in that the low order ten bits of the instruction word are transferred directly to the accumulator. Thus, in the immediate positive addressing mode the last 10 bits of the memory reference instruction word becomes the data or Operand, rather than the address of the Operand.

The inclusive OR operation is performed in all four addressing modes. Instruction 5a) Inclusive OR in the direct addressing mode has the mnemonic IOR X and the Op Code 020. This instruction causes a logical Inclusive OR operation to be performed between the contents of the storage location with the address X and the contents of the accumulator, with the result of this operation being placed in the accumulator. Instruction 5b) Inclusive OR in the indirect addressing mode, differs in that the Inclusive OR operation is performed between the contents of the storage location specified by the contents of the storage location with the address X. In instruction 5c) comprising the immediate positive addressing mode, the Inclusive OR operation is performed between the last 10 bits of the Memory Reference Instruction word and the accumulator, with the result again being placed in the accumulator. The reverse addressing mode is illustrated in instruction 5d). As in instruction 5a), and Inclusive OR operation is performed between the contents of the storage location with the address X and the accumulator. However, in the reverse addressing mode, the results of the Inclusive OR operation are placed in the storage location with the address X rather than in the accumulator.

The inclusive or instruction described above in its various addressing modes is the first instruction in the list which requires two operations. That is, the performance of the instruction requires first a logical operation, an Inclusive OR and than a transfer. The remainder of the arithmetic operations, Add, Subtract, and And also involve two steps in their performance. The instruction 9a) Skip If Accumulator Different in the direct addressing mode is an example of a third general type of instruction. The result of the instruction is the addition of one to the contents of the Machine Pointer if the accumulator does not equal the contents of the storage location specified by X. Thus the instruction is a combination of first a test, and second a transfer conditional upon the result of the test. Instruction 10, Skip If Accumulator Same, is similar.

Instruction 11a) Jump And Save, represents still another general type of instruction in which two transfers are performed. Instruction 11a) also illustrates a design technique wherein the same instruction is performed as a consequence of two different Op Codes. This technique is utilized so that all Op Codes in the series 100, 102, 104, and 106 would cause the machine to perform a specified instruction, thereby avoiding an indeterminate condition of the computer which could result from the accidental presentation of a nonexistent Op Code.

Instruction 14a) Rotate And Skip If Odd, illustrates still another general type of instruction. The performance of instruction 14a) comprises first the step of rotating the contents of the storage location specified by X one bit to the left, and second testing the last bit of the rotated data for equivalence to one. The final step of the instruction, conditional upon the outcome of the test, is incrementing the contents of the machine pointer register and replacing the incremented contents therein. Thus the instruction involves first a transfer of data, second a test, and third an arithmetic operation on the contents of a register, followed by a transfer of data.

The interpretation of the remainder of the Memory Reference Instructions follows from the above discussion. Included on the list of Memory Reference Instructions are instruction 20a) and 20b) Operate Group I and instruction 21a) and 21b) Operate Group II. These Instructions were included in the list because the Op Code triggering further decoding of the micro instruction is similar to the Op Code for the remainder of the Memory Reference Instructions.

OPERATE INSTRUCTIONS

The list of micro instructions available to the programmer presented in FIG. 7. Referring now to FIG. 5, the microinstruction is contained in bits B05 through B15 of the Operate Instruction word.

The Operate Group I instructions have the Op Codes 160 and 170 as noted above. The instructions are listed in the first column of FIG. 7, the codes for the instructions in the second column of FIG. 7, and the result of the instruction in the third column thereof. The Operand of a Operate Instruction is the accumulator.

The Operate Group I microinstructions are divided into three groups, and the instructions in each group are performed during one of three event times occurring in order. The microinstructions performed in event time 1 are Complement Accumulator and Increment Accumulator. The Complement Accumulator instruction is performed in response to a "1" in the bit B05 position of an Operate Instruction word. The result of the Complement Accumulator instruction is that the two's complement of the accumulator is replaced therein. The Increment Accumulator instruction adds one thereto.

The event time 2 Operate Group 1 instructions comprise provision for rotating the accumulator. Bit B07 functions as a rotate enable signal, a rotate being performed when that bit equals "1." Bit B08 distinguishes between a rotations of four right or a rotation of one left. Appropriate "end around" carries accompany the rotations.

The Operate Group 1 instructions performed in event time 3 comprise various skip operations. The bit B15 functions as a reverse skip sense bit, that is a skip is performed only when that bit equals "0" and the indicated test result is true. If the test result is true and the bit B15 equals a "1," no skip may occur.

Any combination of microinstructions are allowable in the same programmed Operate Instruction word; however, the final result of the instruction depends not only on which microinstructions are specified, but also upon the event time in which these operations are performed. Thus if a Operate Instruction word had an Op Code of 160 and "1' " in the bit positions B06, B07, and B11, the machine would first increment the accumulator, then rotate the accumulator one bit left, and then skip if the accumulator thus modified were negative.

FIG. 7 also includes the Operate Group II instructions. As noted in FIG. 6, these instructions have the Op Codes 170 and 174. Bits B05 and B06 are used to specify the two Operate Group II microinstructions, which are Read Machine Pointer and Deposit Program Counter Save. One's in any of the remaining bit position result in no operation, however, the no operation condition occurs if and only if bits B05 and B06 are both "0's." If bits B05 and B06 are both "1's" the instruction will be decoded as if only bit B05 were a "1." The Operate Group II instructions are useful in returning from subroutines to the main program.

OPERATING MODES

The operation of the computer also proceeds in a specified manner through a series of operating modes. A particular operating mode is specified by a combination of conditions including the previous operating mode, the decoding of the instruction currently being performed by the computer, and external information presented to the computer, such as the existence of certain power levels, and interrupt requests.

The five operating modes are fetch/skip, defer, execute, interrupt, and power on.

In the fetch or skip operating mode the address of the next instruction is determined by first examining the contents of the program counter for the submachine in operation. In the fetch state, that address is temporarily stored in the Arithmetic Logic Buffer 35 while the contents of the program counter are incremented by one and restored to the storage location designated as the program counter register. Incrementing by one places the address of the next instruction in the programmed sequence in the program counter register. Then the address of the current instruction which was temporarily stored in the Arithmetic Logic Buffer is transferred to the Memory Address Register 32, and that address is accessed. The contents of the storage location with that address comprise the instruction to be executed, and are transferred to the Instruction Register 31.

The skip operating mode differs from the fetch operating mode in that the next instruction in the normal programmed sequence is not to be performed, or "skipped." This is accomplished by incrementing by one the address obtained from the program counter, and storing the incremented address in the Arithmetic Logic Buffer. The incremented address in the Arithmetic Logic Buffer is again incremented and placed in the program counter register. The incremented address in the Arithmetic Logic Buffer is then transferred to the Memory Address Register, and the next instruction is fetched from memory and stored in the Instruction.

Operations during the fetch or skip operating modes have placed the new instruction to be executed in the instruction register. If the word comprises a Memory Reference Instruction with bits B04 and B05 specifying the deferred addressing mode, the defer operating is entered. In this mode, the ten address bits of the instruction word are transferred to the Memory Address Register, and the storage location which the address designates is accessed. The low order ten bits of that storage location comprise the proper Operand address for the instruction, and are transferred to the instruction register. Only one level of such deferred addressing is permitted.

After completion of the fetch/skip and defer operating modes, the instruction register contains the next instruction to be executed and the proper Operand or address. The machine then enters the execute operating mode wherein the proper sequence of transfers and arithmetic operations are performed to execute the instruction. These results of the instructions are discussed above.

The user of the machine may externally request a change in the contents of the machine pointer by setting the desired new address on the Interrupt Input 45 of FIG. 1 and requesting an interrupt. When the interrupt is granted, the interrupt operating mode is entered and the new address loaded into the Machine Pointer register. This has the effect of switching the operation of the computer to another submachine. In order not to disrupt the program sequence of the machine currently in operation, the interrupt operating can only be entered at the completion of the execute mode if a skip is not called for, or after the program counter has been incremented and restored during the first half of a skip cycle. The interrupt operating is followed by the fetch/skip mode which initiates running of the newly designated submachine by obtaining the next instruction from its program counter.

The power on operating mode is entered when the computer is first turned on. A JUMP instruction is forced into the Arithmetic Logic Buffer and transferred to the Instruction Register. This JUMP instruction loads the Machine Pointer Register with the predetermining address of the program counter of a submachine. That submachine may be the first of a series to be activated. The execute operating mode is entered following the power on mode, and the machine thereafter to run in normal fashion.

The power on is also entered whenever an attempt is made to access a storage location which is not physically present in the machine, or fails to respond to the access request, thereby preventing an indeterminate condition in the computer operation.

FIG. 8 shows the allowable transitions between the various operating modes. The machine starts in the power on mode, and proceeds to the execute mode. Following the execute mode, the computer may return to either the skip or fetch state. However, if an interrupt has been requested the computer may grant the interrupt following the execute mode if no skip is designated by entering the interrupt operating mode. If a skip is to be performed, the computer enters the skip mode before proceeding to the interrupt mode. Following the interrupt operating mode, the machine returns to the fetch operating mode. At the conclusion of the operations performed in the skip/fetch operating mode, the machine may proceed either directly to the execute operating mode, or indirectly to the execute operating mode through either the defer or power on operating modes. The power on mode may also be entered at the conclusion of the defer operating mode.

TIMING

The basic timing source for the computer is the oscillator 39 which produces a 5 megahertz square wave. The timing unit of the computer uses the oscillator pulses to form six timing substates, $T_A$–$T_F$, which are grouped into three timing states $A_X$, $D_R$, and $D_W$ as discussed herein.

The details of the timing involved in starting up the computer are shown in timing diagram of FIG. 9. Supplying power to the computer begins its operation. First a power on signal and then a power OK signal are produced when the power supply achieves a proper operating level. This is indicated on the timing diagram of FIG. 9 by a change in level at 210 on the power OK line. The power OK signal permits the oscillator to start running, producing timing pulses with a half pulse duration of 100 nanoseconds as indicated at 211. In response to a combination of the power OK signal and the first clock pulse produced by the oscillator, the Master Reset Bus, produced by a clocks off flop, goes to ground as indicated at 212, and the Run Allow signal comes up as indicated at 213. These changes permit formation of the Master Clock pulses, the first of which is indicated at 214. The Master Clock pulses are produced by an integrating circuit which narrows the pulse width to 70 nanoseconds. This insures that transfers performed at the trailing edge of the master clock pulse are begun before the trailing edge of the oscillator pulse, which is also used in timing the machine.

The trailing edge of the first Master Clock pulse 214 triggers a change in the condition of a Run 1 and Run 2 flip-flop in the timing unit 38, which changes are indicated at 215 and 216. The positive condition of these two flops permits the formation of the first transfer clock pulse 217.

The computer begins operation with an $\overline{\text{initialize}}$ signal in its true condition. The $\overline{\text{initialized}}$ signal is used throughout the central processor in conditioning various flip-flops and gates to their proper states for the start up procedure. For instance, the initialized signal forces the timing unit into the $T_C$ timing substate. The initialize pulse also forces the computer into the power on operating mode. It also conditions gates forming the first address to be loaded into the Memory Address register, which address specifies the starting instruction for the computer. After these functions have been performed, the $\overline{\text{initialize}}$ signal goes negative after the first complete transfer clock cycle as indicated at 220.

At this point all Clock and other signals necessary to the running of the computer are in existence. The computer is in the $T_C$ timing substate of the timing state $D_R$, and is further in the power on operating mode. The operation of the computer from this time follows the above discussion relating to the operating modes and instructions. The only change in the signals of FIG. 9 which occurs during normal operation of the computer is that the Run 1 signal goes negative for one clock cycle at the beginning of the timing substate $T_C$ as indicated at 221. This serves to maintain the $T_C$ substate for two complete clock cycles, and holds back formation of the transfer clock for one clock pulse.

FIG. 10 shows the timing of the clocks and other signals appearing on the T-Bus for a basic read-write cycle involving data transfer. The address of the storage location to be accessed is loaded into the Memory Address register 32 on the leading edge of a Master Clock pulse 230 during the timing substate $T_B$. The address is transmitted directly to the various storage units over the Address Bus 41, and the partially decoded address is transmitted to preselected storage locations over the Special Address Bus 48. With the occurrence of the trailing edge of the clock pulse 230 during timing substate $T_B$, the timing unit advances to timing substate $T_C$ where it remains for two Master Clock pulses. This allows sufficient time for the addressed storage device to respond by pulling the appropriate present line to ground. If no response is made by the leading edge of the second clock pulse 231 during the timing substates $T_C$, the control unit forces the machine into the power on operating mode and proceeds as will be discussed below. In FIG. 10, a Priority I storage device is shown responding to the address by pulling the $\overline{\text{Present II}}$ line to ground as indicated at 233.

During the second half of the timing substate $T_C$, Bus A is pulsed as indicated at 234. If the addressed storage device is present, it gates bus A against the Master Clock and initiates a ready cycle. At the same time it pulls the $\overline{\text{Busy}}$ Bus to ground as indicated at 235, and the timing unit advances to the timing substate $T_D$. The grounding of the $\overline{\text{Busy}}$ Bus also causes the Run 1 signal to go to ground as indicated at 236, which prohibits formation of the Transfer Clock.

The timing substate $T_D$ is asynchronous. The computer remains in the timing substate $T_D$ until the storage device has completed the read cycle and so signals by restoring the $\overline{\text{Busy}}$ Bus to the positive level as shown at 237, which change in level also permits the Run 1 signal to go positive as shown at 240, and further permits the transfer clock to again be formed.

During both the timing substates $T_C$ and $T_D$, the B-Bus is at the positive level and whatever data is in the outputs of the address storage device is gated onto the data lines 40 of the T-Bus. To insure proper transfer of data, the storage device must load its output register at least 1/200th nanosecond Master Clock cycle before it restores the $\overline{\text{Busy}}$ Bus to the positive level. As discussed herein, the timing substates $T_C$ and $T_D$ comprise the timing state $D_R$.

On transfer clock cycles after the $\overline{\text{Busy}}$ Bus returns to the positive state, the timing unit advances the computer to the timing substate $T_E$ during which the data is written from the transfer bus into the addressed location comprising the destination of the data transfer. If the data must be loaded from the T-Bus, the C-Bus is pulsed as indicated at 241 to clear the destination register. If the data is already present within the destination storage device, e.g., in the Memory Buffer register of the core memory the C-Bus is not pulsed.

The timing unit then advances the computer to the timing substate $T_F$ and pulses the D-Bus as indicated at 242. This sequel, gated against the clock, provides the desired pulse to initiate a write operation in the addressed storage device. Again the storage device responds by pulling the $\overline{\text{Busy}}$ Bus to ground as indicated at 243. The timing unit then advances to the asynchronous timing substate $T_A$ where it remains until the $\overline{\text{Busy}}$ Bus line is returned to a positive level, indicating that the storage device has completed the write operation. The $\overline{\text{Busy}}$ Bus is shown going positive at 244, resetting the Run 1 signal to a positive level as indicated at 245, and permitting the transfer clock to resume running. As the Run 1 level changes, the timing unit enters the timing substate $T_B$ and initiates a new transfer cycle.

The second transfer cycle shown in FIG. 10 is similar except that a Priority I storage device responds to the address by pulling the $\overline{\text{Present I}}$ bus to ground as indicated at 246.

Referring again to FIG. 9, at the bottom thereof is a signal representing the logical AND of the $\overline{\text{Present I}}$, $\overline{\text{Present II}}$, and $\overline{\text{read-write}}$ inhibit signals. A positive level on this composite signal indicates that either a storage device has responded to an address, or no $\overline{\text{read-write}}$ operation is to take place. The transition to ground indicated at 250 occurs when no storage device answers the address currently being requested by the computer. This could occur from a failure of a device to pull the appropriate present line to ground within the time allotted for this function, or when no storage device exists with the address requested.

To prevent the computer from behaving unpredictably in this situation, the transition of the composite signal indicated at 249 also results in the $\overline{\text{Initialize}}$ signal going high as indicated at 250. The $\overline{\text{Initialize}}$ signal operates in the same manner as when the computer has just been started, and forces the computer into the $T_C$ timing substate and power on operating mode from which it may proceed as described above.

The computer is designed to shut down in an orderly manner without information loss in the event of a power failure. Referring now to the right hand portion of FIG. 9, the computer first learns of a power failure event by the failure of the power OK signal to be generated. The transition of the power OK signal to ground is indicated at 251 of FIG. 9. The Run Allow signal is also caused to go low as shown at 260. A built in delay in the circuitry generating the power OK signal prevents the rise of the signal for a period exceeding 50 microseconds. The computer continues to run with the waning power through the timing substate $T_F$ at the end of the next execute operating mode. The control unit then forces the computer into the interrupt operating mode. If the power OK signal has not come back up by the end of the timing substate $T_B$, the Run 1 and Run 2 signals are no longer produced, thereby also stopping formation of the transfer clock. These events are shown at 252, 253, and 254. The master clock runs for one additional cycle, and the Master Reset Bus signal goes positive at the trailing edge thereof, as shown at 255. When the $\overline{\text{Master}}$ Reset Bus signal goes high, it also raises the $\overline{\text{Initialize}}$ signal as indicated at 256, resetting the computer in the forced $T_C$ timing substate and power on operating mode. This corresponds to the proper condition for beginning operation of the computer, and a return of the power OK signal will restart the computer in its normal fashion as described above.

An interrupt request also pulls the power on signal at ground at the transition indicated at 251. However, upon entering the interrupt operating mode, the interrupt request is granted and the power OK signal is allowed to return to a positive level, thereby permitting the computer to continue to operate and process the interrupt request.

It will thus be seen that the objects set forth above, among those made apparent from the preceding description, are efficiently attained and, since certain changes may be made in the above system apparatus and methods without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method of switching from performing a first program to performing another program in a computer having an addressable random access memory for storing information upon which computations are performable by the computer, an arithmetic logic unit, a control unit, an instruction register, and a memory address register, but not having either a hardware or special memory program counter or accumulator, the method comprising:

A. providing a machine pointer register for storing any address of the addressable random access memory;

B. storing a plurality of programs in the addressable random access memory, each program comprising a plurality of instructions stored in serially addressed storage locations;

C. assigning a different set of storage locations in the addressable random access memory for each program, each separate set of storage locations comprising at least one storage location for use as a program counter and at least one storage location used as an accumulator the address of which differs from the address of the storage location used as a program counter by a constant in the addressing scheme;

D. providing in each program an instruction to load the machine pointer register with the address of the storage location used as a program counter for another of the plurality of programs;

E. executing a first one of the programs stored in the addressable random access memory by a. placing the address of the storage location used as a program counter for the program in the machine pointer register, b. obtaining a first instruction of the program from the address held in the storage location used as a program counter, c. adding one to the address of the first instruction of the program to obtain the address of the next instruction of the program and placing the address of the next instruction of the program in the storage location used as the program counter, d. performing the first instruction of the program, e. adding the constant to the address stored in the machine pointer to derive the address of the storage location used as an accumulator in order to address the accumulator when necessary in performing the instruction, and f. iteratively repeating the above steps b–e for the subsequent instructions of the first program preceding the instruction to place the address of the storage location used as the program counter for another program in the machine pointer register;

F. repeating the above step E) for the second program and for all subsequent programs;

G. at any time during execution of any program, loading the machine pointer register with the address of the storage location used as a program counter for any other program stored in the addressable random access memory, wherein execution of the program being executed is abandoned leaving the contents of the storage locations used as the program counter and accumulator for that program intact in the addressable random access memory; and H. repeating steps E) and F) to execute the program associated with the addressed storage location used as a program counter for that program loaded into the machine pointer register.

* * * * *